United States Patent
Collares et al.

(10) Patent No.: US 11,227,269 B2
(45) Date of Patent: Jan. 18, 2022

(54) ENHANCED MANAGEMENT SYSTEMS AND APPARATUSES

(71) Applicant: Accenture Global Solutions Limited, Dublin (IE)

(72) Inventors: Leonardo Collares, Tidade Monções (BR); Andre Souza, Santo André (BR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 193 days.

(21) Appl. No.: 16/181,807

(22) Filed: Nov. 6, 2018

(65) Prior Publication Data

US 2020/0143348 A1 May 7, 2020

(51) Int. Cl.
*G06Q 20/14* (2012.01)
*G06N 7/00* (2006.01)
*G06N 20/00* (2019.01)

(52) U.S. Cl.
CPC ............ *G06Q 20/14* (2013.01); *G06N 7/005* (2013.01); *G06N 20/00* (2019.01)

(58) Field of Classification Search
CPC ........ G06Q 40/00; G06Q 20/00; G06Q 20/04; G06Q 7/005
See application file for complete search history.

(56) References Cited

U.S. PATENT DOCUMENTS

| | | | | |
|---|---|---|---|---|
| 6,658,393 B1 * | 12/2003 | Basch | ................ | G06Q 20/341 705/35 |
| 7,962,403 B2 * | 6/2011 | Banasiak | ............ | G06Q 40/025 705/38 |
| 8,660,943 B1 * | 2/2014 | Chirehdast | ............ | G06Q 40/00 705/38 |
| 2009/0119170 A1 * | 5/2009 | Hammad | ............... | G06Q 20/32 705/14.17 |
| 2013/0013347 A1 * | 1/2013 | Ling | ................. | G06Q 10/0833 705/4 |
| 2013/0238387 A1 * | 9/2013 | Stibel | ..................... | G06Q 40/02 705/7.28 |
| 2015/0082277 A1 * | 3/2015 | Champlin-Scharff | .... | G06F 8/70 717/120 |
| 2015/0332414 A1 * | 11/2015 | Unser | ..................... | G06Q 40/12 705/30 |
| 2016/0086284 A1 * | 3/2016 | Ghosh | ..................... | G06Q 40/08 705/4 |
| 2018/0040064 A1 * | 2/2018 | Grigg | ...................... | G06N 5/022 |
| 2018/0189870 A1 * | 7/2018 | Weinflash | .............. | G06Q 40/12 |
| 2018/0268015 A1 * | 9/2018 | Sugaberry | .............. | G06N 5/003 |

* cited by examiner

*Primary Examiner* — Bennett M Sigmond
*Assistant Examiner* — Xavier M. Bennett
(74) *Attorney, Agent, or Firm* — Jordan IP Law, LLC

(57) ABSTRACT

An artificial intelligence system for managing a consumer relationship is provided. The artificial intelligence system includes: one or more client entities; a storage device configured to store data related to actions and characteristics of the one or more client entities, the actions and characteristics relating to payment of accounts receivable; one or more machine learning server devices configured to generate and update a machine learning model based on previous actions and characteristics of said one or more client entities; and predict future actions of the one or more client entities with respect to the payment of accounts receivable, based on the machine learning model.

20 Claims, 29 Drawing Sheets

ENHANCED MANAGEMENT SYSTEMS AND APPARATUSES

FIELD OF THE DISCLOSURE

This disclosure generally relates to enhanced management systems and apparatuses for managing consumer relationship.

BACKGROUND

Managing consumer relationship of many different business partners is technologically difficult and resource-intensive, which means increased costs with respect to time and money for the companies that perform these services. Additionally, independent technologies are oftentimes implemented for different management systems which also contributes to inefficiencies and excessive cost.

SUMMARY

Consistent with the disclosure, exemplary embodiments of systems, apparatuses, and methods thereof for enhancing management systems and apparatuses related to managing accounts receivables, are disclosed.

According to an embodiment, an artificial intelligence system for managing a consumer relationship is provided. The artificial intelligence system includes: one or more client entities; a storage device configured to store data related to actions and characteristics of said one or more client entities, the actions and characteristics relating to payment of accounts receivable; and one or more server devices. The one or more server devices are configured to: generate and update a machine learning model based on the actions and characteristics of said one or more client entities; predict future actions of said one or more client entities with respect to the payment of accounts receivable, based on the machine learning model; and cluster a subset of said one or more entities based on characteristics common to each of the entities in the subset, the characteristics being based on the machine learning model.

According to another exemplary embodiment, an apparatus includes: a first interface to receive input on identities of one or more entities; a second interface to receive data related to actions and characteristics of said one or more entities, the actions and characteristics being related to payment of accounts receivables; and a processor communicatively coupled to a storage device and the first interface and the second interface. The storage device is configured to store the data related to actions and characteristics of said one or more entities. The processor is configured to: group said one or more entities based on determined actions and characteristics of said one or more entities; generate a machine learning model based on the data related to previous actions and characteristics of said one or more entities; apply algorithms of the machine learning model to predict probability of payment or non-payment on the accounts receivable; and cluster a subset of said one or more entities based on characteristics common to each of the entities in the subset, the characteristics being based on the machine learning model.

According to another exemplary embodiment, a method of an artificial intelligence system includes: identifying one or more entities; receiving data related to actions and characteristics of said one or more entities, the actions and characteristics being related to payment of accounts receivables; grouping said one or more entities based on determined actions and characteristics of said one or more entities; generating a machine learning model based on the data related to previous actions and characteristics of said one or more entities; applying algorithms of the machine learning model to predict probability of payment or non-payment on the accounts receivable; and clustering a subset of said one or more entities based on characteristics common to each of the entities in the subset, the characteristics being based on the machine learning model.

According to yet another exemplary embodiment, a non-transitory computer readable medium comprising a set of instructions, which when executed by one or more processors of an authentication device, cause the one or more processors to: identify one or more entities; receive data related to actions and characteristics of said one or more entities, the actions and characteristics being related to payment of accounts receivables; group said one or more entities based on determined actions and characteristics of said one or more entities; generate a machine learning model based on the data related to previous actions and characteristics of said one or more entities; apply algorithms of the machine learning model to predict probability of payment or non-payment on the accounts receivable; and cluster a subset of said one or more entities based on characteristics common to each of the entities in the subset, the characteristics being based on the machine learning model.

It is to be understood that both the foregoing general description and the following detailed description are exemplary and explanatory only and are not restrictive of the invention, as claimed.

BRIEF DESCRIPTION OF THE DRAWINGS

The various embodiments will become apparent to one skilled in the art by reading the following specification and appended claims, and by referencing the following drawings, in which:

FIGS. 9-27 illustrate graphical user interfaces (dashboards) according to exemplary embodiments;

DESCRIPTION OF THE EMBODIMENTS

Figure 1:
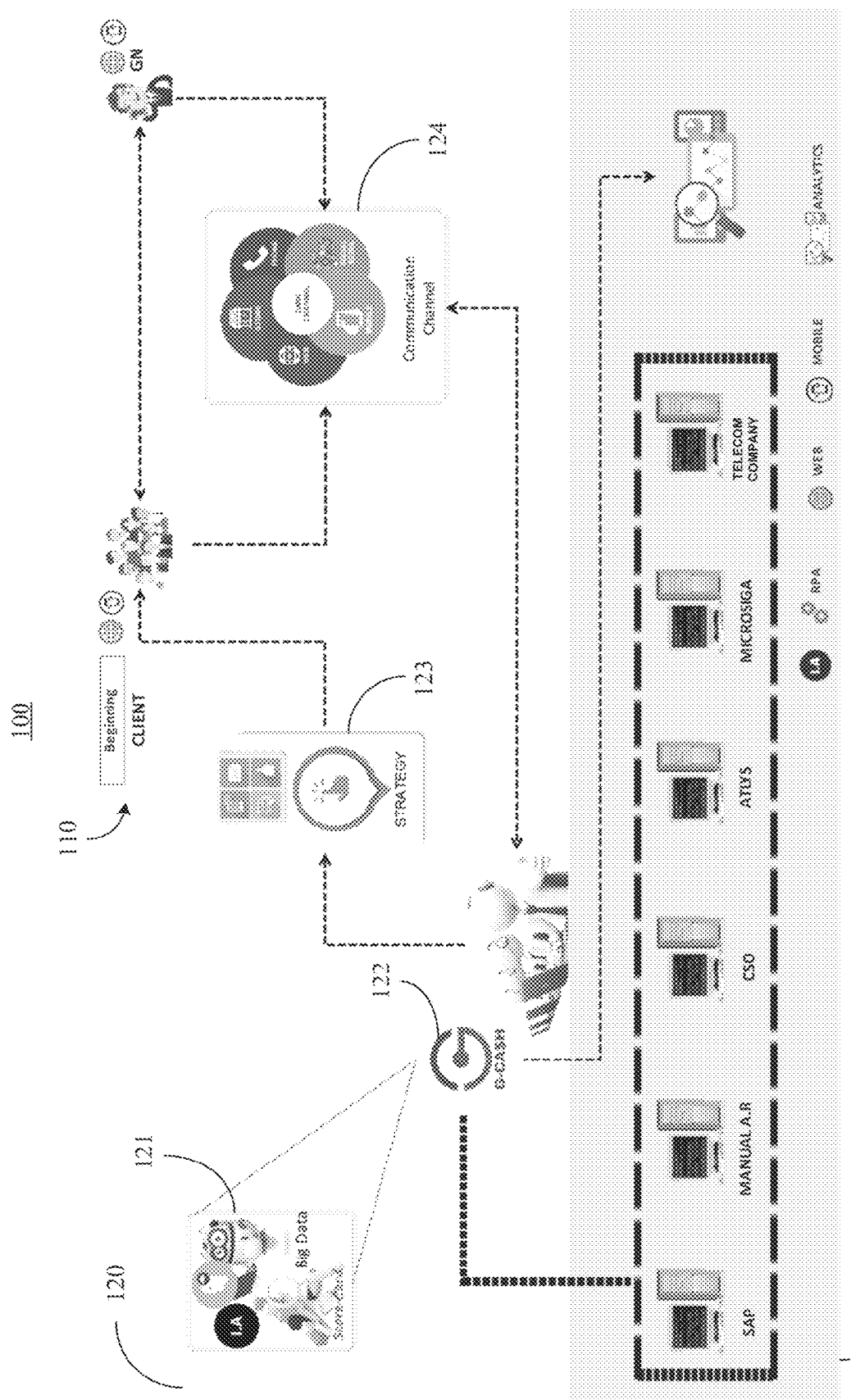
FIG. 1 illustrates an overall system architecture according to an exemplary embodiment.

While the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," an illustrative embodiment," etc., indicate that the embodiment described may include a particular feature, structure, or characteristic, but every embodiment may or may not necessarily include that particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a machine readable (e.g., computer-readable) medium or machine-readable storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Rapid advances in technology have created computerized tools that enable companies to better interact with their customers. Such tools are one component of customer relationship management (CRM), a management philosophy in which a primary theme is the value of building equity in the relationships with customers. As this relationship equity builds, the customer's attachment and loyalty to the company increases, the likelihood that the customer will switch to a competitor decreases, and the company's sales to that customer inevitably increase.

A CRM system may analyze customer data that is collected through multiple sources and may present the analyzed data in a manner such that business managers can make informed decisions based on the analyzed data and the presentation thereof. Techniques such as data mining, correlation, and pattern recognition may be used to analyze customer data. Such analytics may help improve customer service by helping to find small problems which can be solved, perhaps, by showing data that compels different types of marketing or communication to different consumer audiences. For example, through the analysis of a target customer base' buying behavior, a company might determine that this customer base has not been buying a significant amount of products recently. Accordingly, after reviewing and analyzing such data, the company might make an informed decision to market to this target customer demographic differently, in order to best communicate how the company's products might be of benefit to the targeted customer base. In a different scenario, a company might also utilize a CRM system to monitor customer actions and behavior with respect to payment of accounts receivable.

With a single CRM system, it may be possible to manage the accounts receivable of many different clients. Such may be performed using a tool which utilizes multiple channels of information and artificial intelligence to generate a "collection scorecard" algorithm for each client.

In an exemplary implementation, a "collection scorecard" algorithm may be generated by comparing open invoices for clients over 5 days. In comparing open invoices, the status(es) of disputes, promise(s) of payment, miscellaneous claims or any other customer history, billing and credit, may be considered. Subsequently, market data to identify presumed average billing, borrowing capacity and any registration with local banks or government agencies, may be used to then compose the collection score card. Such a system may provide analytics which show accounts receivable results, status, and performance, and which also helps build predictive models. Requests for invoices, payment promises, clearing invoices, and other management functions may be performed using systems, apparatuses and methods according to exemplary embodiments. The technological tool mentioned above and as described below, may provide a customer panel, an escalation panel and/or a workflow panel which provide GUIs (e.g., dashboards, FIGS. 9-27) to analysts to perform the operations and achieve the objectives described herein.

Referring to FIG. 1, a system 100 according to an exemplary embodiment is shown, where nodes in the system 100 may be communicatively coupled via a wired and/or wireless connection. The nodes of the system 100 may constitute different levels within the overall system 100. The levels of the system 100 may include, but are not limited to, a consumer level 110, an intermediate level 120, and a service provider level 130. The consumer level 110 may include businesses/organizations and/or individuals. The intermediate level 120 may include a computing device (e.g., server) 122 that applies and implements machine learning by considering and factoring-in, among other things, big data 121 and scorecards. Big data may refer to a large set of data that is stored based on volume, variety, veracity and value. The computing device 122 may provide a strategy to consumers in consumer level 110 and may receive instructions and/or data from the consumer level 110 via a communication channel. The service provider level 130 may include nodes for communicating with the consumer level 110. Such communication between the service provider level 130 and the consumer level 110 may occur directly or, alternatively, via the intermediate level 120.

Figure 2:
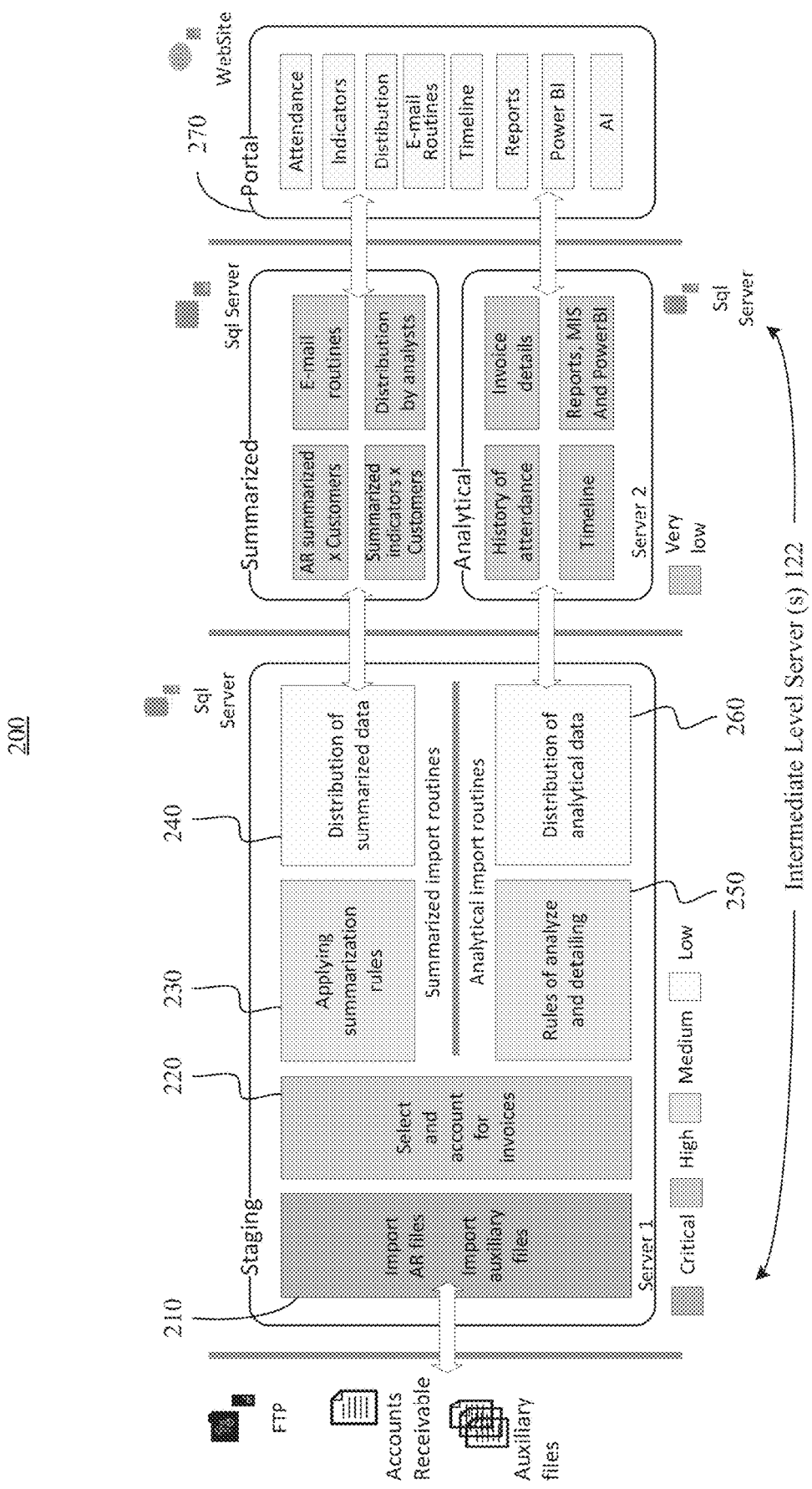
FIG. 2 illustrates another system architecture according to an exemplary embodiment.

Turning now to FIG. 2, a system architecture according to an exemplary embodiment is illustrated. In FIG. 2, accounts receivable and auxiliary files may be imported, via Block 210, into one or more intermediate level servers 122 (e.g., Server 1, Server 2). The intermediate level servers 122 may be implemented in SQL servers or the like, and/or communicate with SQL servers. Transmission of the files may occur using file transfer protocol (FTP) or any transmission protocol or process. In Block 220, the first intermediate level server 122 may select and account for outstanding invoices based on the received files. The intermediate level server 122 may apply summarization rules, via Block 230, to the received data and distribute the summarized data in Block 240. In Blocks 250 and 260, the intermediate level server(s) may also apply analysis rules and distribute the analyzed data.

A second intermediate level server (e.g., Server 2) may receive the distribution of summarized data that is generated by a first intermediate level server. The second intermediate level server may summarize the accounts receivable data with respect to respective customers. The second intermediate level server may also receive the distributed analytical data and generate a history of attendance and a timeline related to the distributed analytical data. A history of attendance may include system information of all communications made by customers in order to understand the customers' behavior, such as the number of open disputes, payment promises made, broken payment promises, etc.

The data that is generated by the second intermediate level server may be output using email routines and reports, to a web portal 270 in order to inform an analyst of information related to a customer's accounts receivable. Via the web portal 270, several different data items may be shown, including: attendance record, indicators, distribution, email routines, timelines, reports, etc.

Figure 3A:
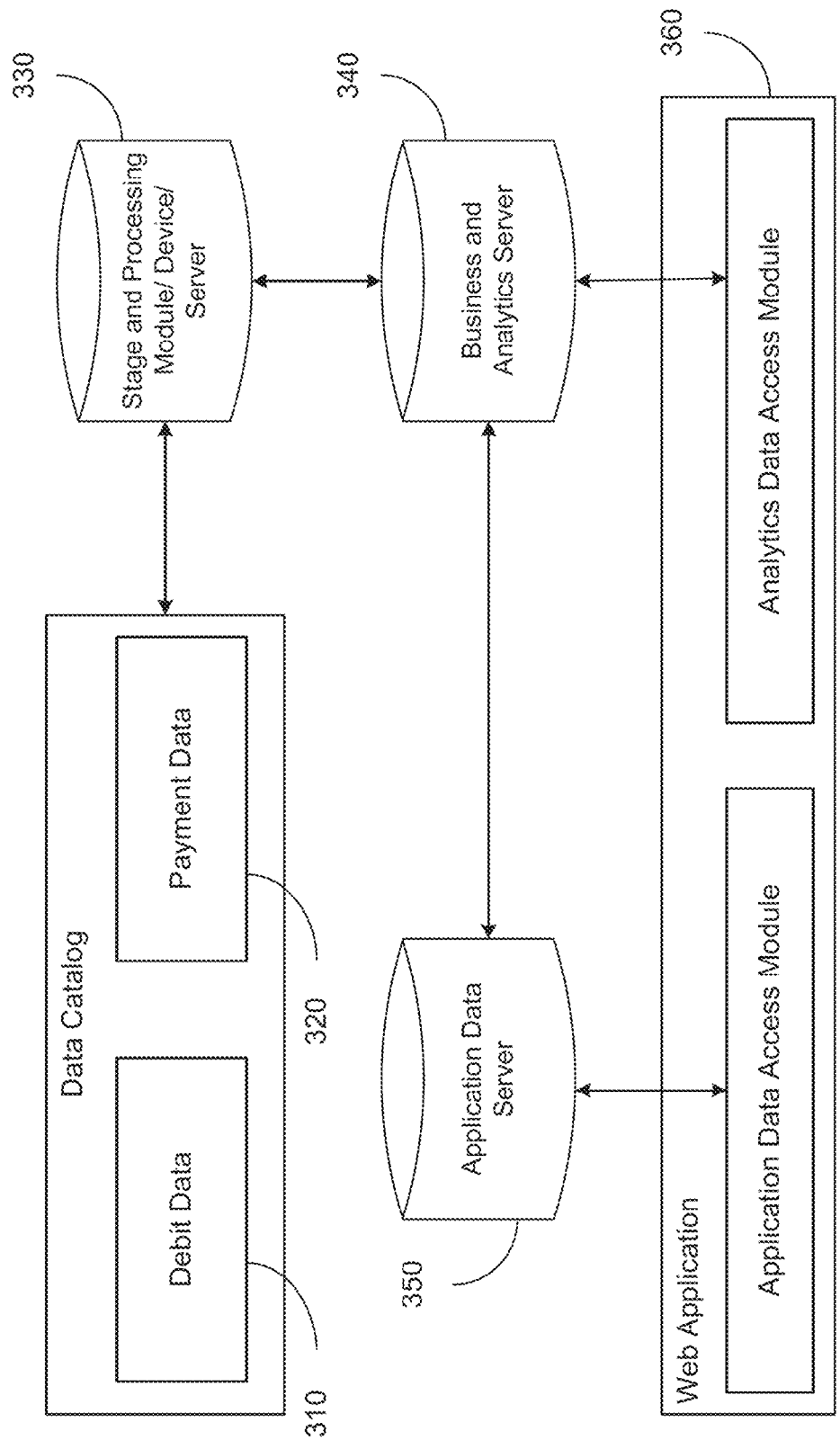
FIGS. 3A and 3B illustrate other system architectures according to an exemplary embodiment.

Turning now to FIG. 3A, another system architecture according to an exemplary embodiment is illustrated. In FIG. 3A, customer debit data 310 and payment data 320 may be received through, for example, a secure file transfer protocol (SFTP) server at an intermediate level server 122. The intermediate level server 122 may acknowledge the incoming of data and start processing the files using, for example, Sql Server Integration Services, and start to normalize and sanitize the data into multiple tables. Once the data is normalized, a Stage and Processing module/device/server 330 may move the data into the incoming tables of the Business and Analytics Sql Server 340 using, for example, the TCP protocol. After all the data is pushed into the Business and Analytics Server 340, the Sql Server Integration Sql Server Integration Services may begin processing all the Customer, Debit and Payment data to split it into multiple tables and then provide the analytical and summarized data; once the data is processed it is ready to be pushed to the Application Data Sql Server 350 which may be a mirror of the final process tables of the Business and Analytics Sql Server 340. After the data is ready to be pushed to Application Data Sql Server 350, the Business and Analytics Sql Server 340 may begin to overwrite the data into the Application Data Sql Server 350.

According to another exemplary embodiment, Web Application 360 may be a central hub that displays data contained in the databases and main access to one or more functionalities, including application data access and analytics data access. Application data access may provide access to summarized data from any customer and analytics data may provide all the details that were used to create the summarized data. The Web Application 360 may be designed to be accessed through various protocols, including HTTPS, where the data may be transmitted over an encrypted channel. User access may be protected by using a unique id and password that cannot be transferred.

Figure 3B:
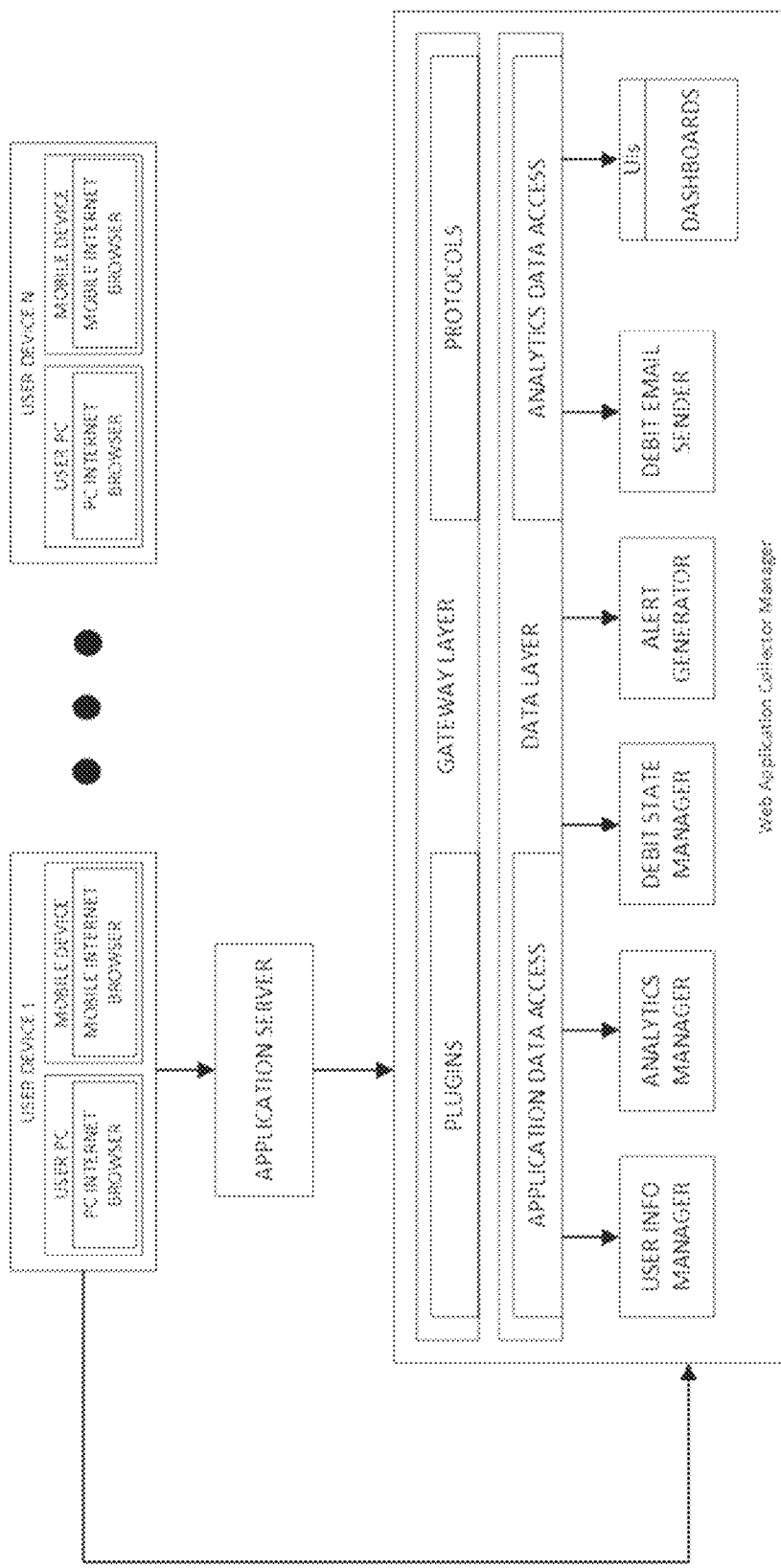

The exemplary embodiment of FIG. 3A illustrates an exemplary data catalog import process in which data files (e.g., plain text format) may be imported into the Stage and Processing module/device/server 330, and then business rules may be applied via the Business and Analytics server 340. After the data is processed, key performance indicators and core data may be pushed into Application Data Server 350 and then consumed by the Web Application 360. FIG. 3B illustrates an alternative system architecture for implementing the solution(s) set forth herein.

Figure 4:
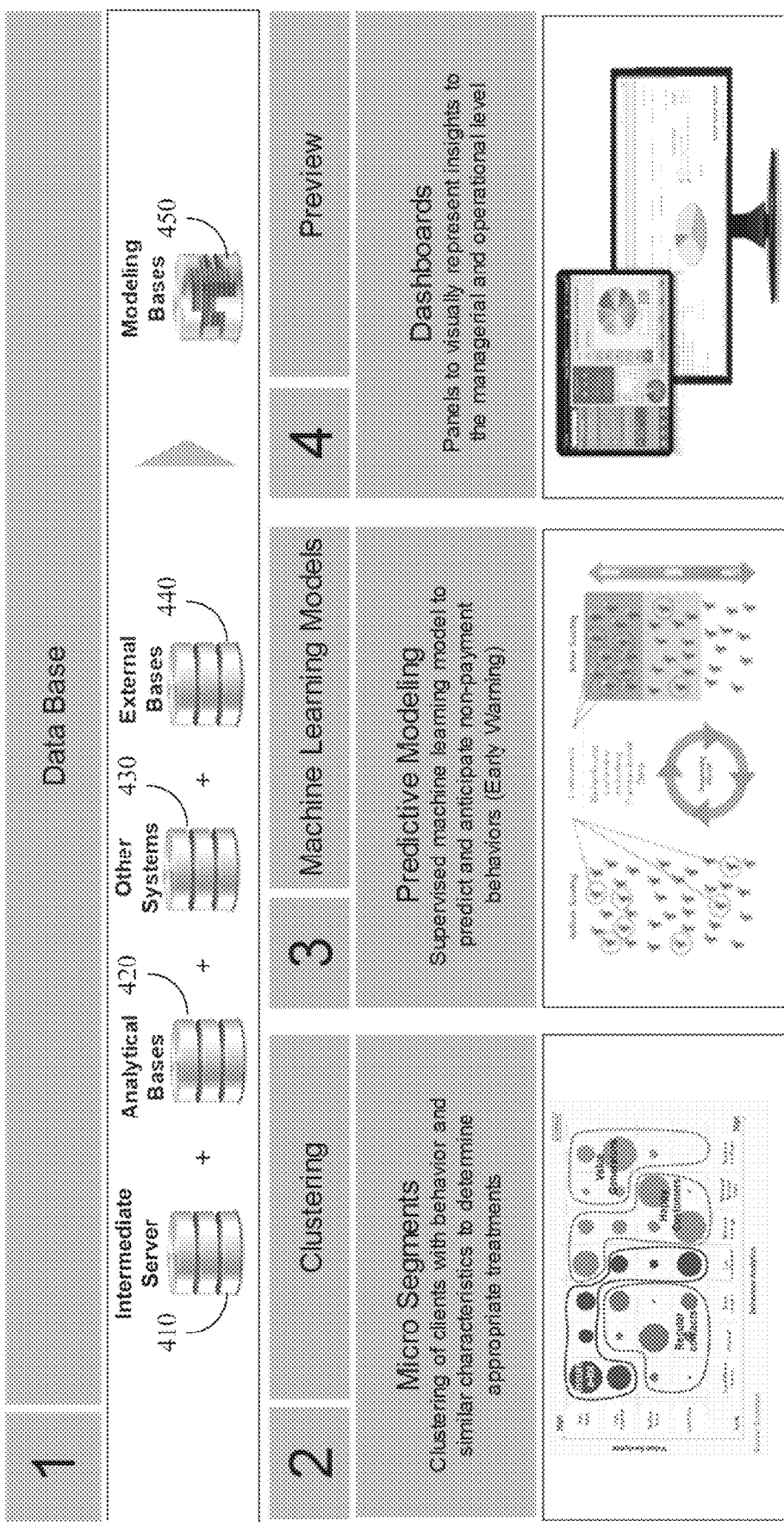
FIG. 4 illustrates aspects of the process of building an intelligent machine learning system related to customer relationship management (CRM)

FIG. 4 illustrates aspects of a process of building an intelligent machine learning system related to CRM. Aspect 1 of FIG. 4 shows the use of an intermediate server 410, analytical bases/data 420, other systems 430, and external bases/data 440 to generate model bases/data 450 according to an exemplary embodiment. Aspect 2 of FIG. 4, "Clustering", shows how a system according to an exemplary embodiment may cluster customers/clients with similar actions, behavior and characteristics together, to determine appropriate treatment for these customers with demonstrated similarities. The clusters of customers may be referred to as micro-segments. Aspect 3 of FIG. 4 illustrates machine learning models that may be implemented to predict and anticipate, for example, non-payment behavior (i.e., early warning signs). Aspects 1-3, as described above, may be performed or implemented at the intermediate level 120 (FIG. 1). Aspect 4 of FIG. 4, according to an exemplary embodiment, shows how GUIs, or dashboards/panels, may be implemented to visually represent insights to the managerial and operational levels of a company.

According to an exemplary embodiment, the process of developing an intelligent machine learning system related to CRM may be initially defined by a choice of data for use in predictive modeling (410, 420, 430, 440) and how this data may be related to the generation of a single analytical base/data (450). In this process, the construction of Clustering (aspect 2 of FIG. 4) may be performed with segmentation techniques 510 (FIG. 5) that perform the grouping of registering activity and behavioral information to generate micro segments with characteristics similar to each other. This may lead to the creation of machine learning models (aspect 3 of FIG. 4) that use predictive modeling techniques (520, 530 of FIG. 5) to calculate the probability of the occurrence of a business-related event, which in this case may be a non-payment of an invoice. Additionally, there may be the development of different forms of visualization (aspect 4 of FIG. 4), aligned with the characteristics of the business, and the generation of insights through the construction of dashboards that relate the micro segments and predictive models constructed in the above-described operations. This entire process may be carried out through the flow of FIG. 6.

The above-illustrated aspects of an intelligent machine learning building process according to an exemplary embodiment are not exhaustive and may include other aspects that are not shown.

Figure 5:
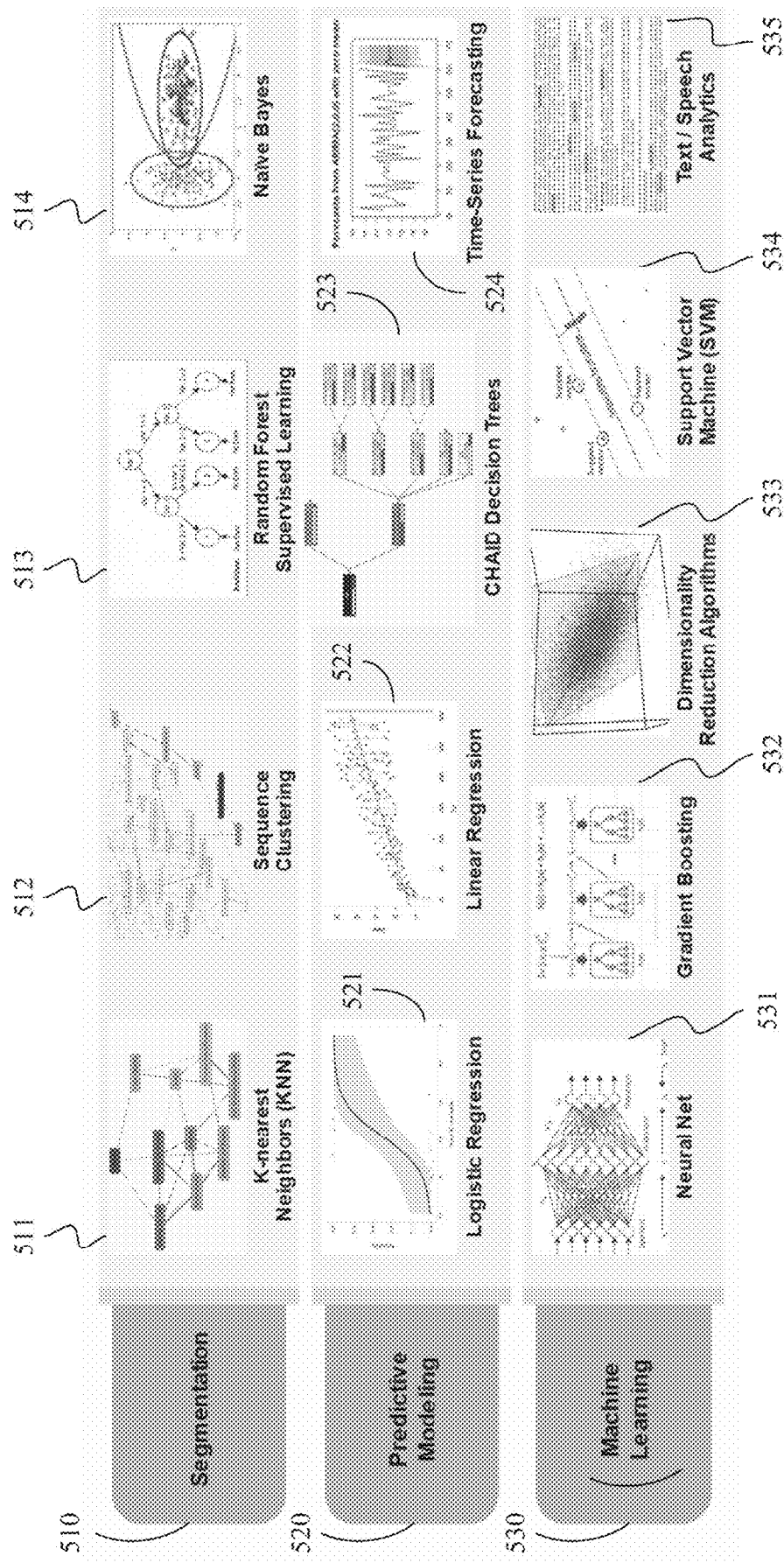
FIG. 5 illustrates various advanced analytical techniques related to predictive forecasting according to an exemplary embodiment.

Depending on the objectives, available data, and potential results of a model, different advanced analytical techniques may be implemented. FIG. 5 illustrates different advanced analytical techniques including, but not limited to: segmentation 510, predictive modeling 520, and machine learning 530. Segmentation 510 may include techniques such as, for example, K-Nearest Neighbors (KNN) 511, sequence clustering 512, random forest supervised learning 513, and naïve bayes 514. Predictive modeling 520 may include logistic regression 521, linear regression 522, CHAID decision trees 523, and time-series forecasting 524. Machine learning 530 may include neural networks 531, gradient boosting 532, dimensionality algorithms 533, support vector machines (SVM) 534, and text/speech analytics 535.

According to an exemplary embodiment, segmentation techniques 510 may be applied with specific focus on the objectives related to aspect 2 of FIG. 4, since segmentation techniques 510 may generate the micro segments that identify the groups of individuals with characteristics like each other. Predictive modeling techniques 520 may be applied to achieve the objectives related to aspect 3 of FIG. 4, since predictive modeling techniques 520 may be used to predict the probability of occurrence of a certain event, which in this case may be the non-payment of an invoice, based on defined parameters that comprise a static equation, which is applied in a recurrent way over time. Machine learning techniques 530 may also be applied to the objectives of aspect 3 of FIG. 4, with the difference being that the parameters may also be defined initially, through the initial training of techniques; but the equation generated is not static and may be constantly modified as invoice and payment information is updated in the system (see FIG. 6 below), allowing greater adaptation of the parameters to possible changes in the behavior of the subjects being analyzed.

A technique for generating the model of the propensity for non-payment of invoices, may relate to neural networks 531, and the logistic regression 521 may be the technique that presents the best performance among the predictive modeling techniques 520, but may provide inferior results to the machine learning techniques 530. For the client clustering process, an optimal technique may be the K-nearest neighbors algorithm 511, which may produce superior results to other segmentation techniques 510.

The development of model algorithms may be based on the flow described in FIG. 4, with the techniques of FIG. 5 being applied as follows: the process of model construction (aspect 3 of FIG. 4) may apply the techniques of predictive modeling 520 and machine learning 530 to determine, for example, the probability of non-payment of an invoice, given the characteristics of an invoice in the transaction. With this data, the results of this model may be used as behavioral information for a clustering process (aspect 2 of FIG. 4), where the general characteristics of the customers may be evaluated along with the aspect related to the payment of their invoices. In this way, segmentation techniques 510 may be applied to a dataset to generate microsegments of clients that have characteristics common to each other.

According to an exemplary embodiment, advanced analytical techniques may be used, for example, to classify the probability of invoices being paid. Determining the probability of payment may involve the consideration of internal data (e.g., characteristics of the invoices themselves), as well as external data such as contact data, which may help in the collection process. In this way, the results of a machine learning model may be used as predictor variables in, for example, a non-supervised segmentation method, which classifies the clients according to their general characteristics in addition to determining the estimated payment a client is likely to pay on their invoices. Such a machine learning model may generate groupings to create customized solutions based on the types of companies involved and observed payment histories of such companies.

The process of applying a particular analytical model may be performed on a periodic basis (e.g., weekly, monthly), using the information obtained and/or generated in an intermediate level server 122 and external data of the companies (e.g., registration data and contact information). One or more of this data may be applied in a machine learning algorithm that analyzes one or more of the invoices in a system (e.g., invoices for a particular organization) and classifies the invoices according to the probability of payment. Next, the data may output to a clients' view (i.e., interface), where a segmentation algorithm may be applied, which may use results of a machine learning model combined with external data that include, for example, business activity indicators. Each customer may be assigned to a different group, and the invoices of the customers may be provided within a business analyst's records and ranked by the probability of payment, thereby providing a new point of view to the business.

Figure 6:
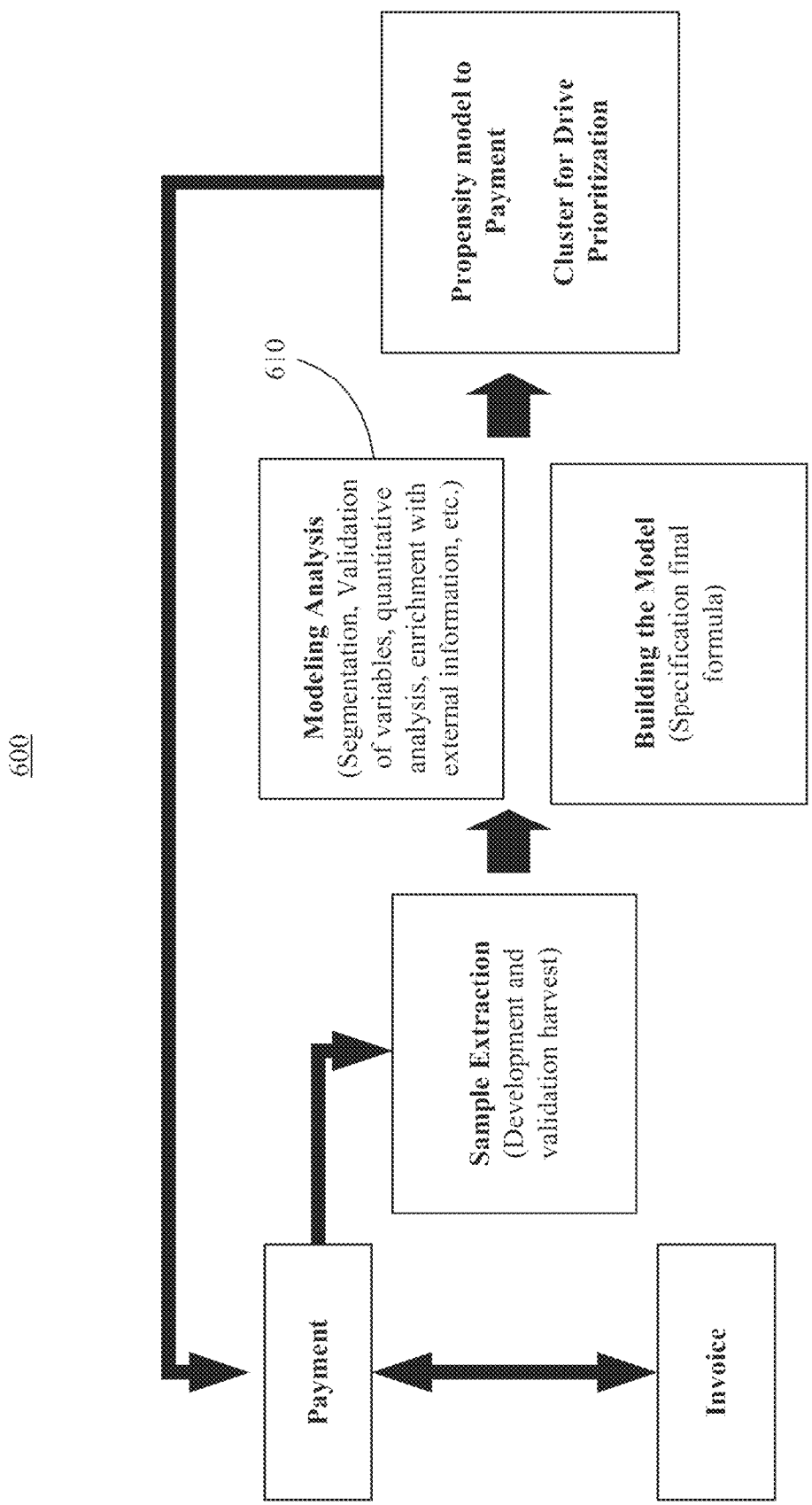
FIG. 6 illustrates a continuous system process according to an exemplary embodiment.

FIG. 6 shows an exemplary use flow 600 according to an exemplary embodiment. Initially, according to an exemplary embodiment, the invoice information available in an intermediate level server 122 and the payment records for a same period, may be combined for analytical database generation. Based on this accumulation of data, determination of specific data for particular clients and sample selections for the development and validation of the results may be carried out. After these determinations are generated, the machine learning and segmentation algorithms, whose results may be validated in all the samples, may be specified for implementation in the system. From this implementation, in Block 610, the modeling may include the segmentation, which may be integrated into the initial bases/data and used in the analytical process. According to this exemplary embodiment, the intelligent CRM system continually evolves and incorporates previous data obtained using advanced analytical techniques, to inform the data generated using updated data models.

According to yet another implementation of an exemplary embodiment, consider company "A", which has a multiple number of invoices due in a reference month. For the relevant invoice information, a predictive model using machine learning techniques (520, 530) may be applied, and each of the invoices may receive a score, according to the probability of payment. These invoices may be classified into risk levels—that is, classes that identify the invoices according to their scores—and these levels may be combined with variables referring to the characteristics of the company in the clustering process. In the clustering process, segmentation techniques 510 may be applied to define micro segments with the characteristics in common with the clients, and the probability of payment of their invoices is considered. In this way, company "A" may be classified in a micro segment, and its invoices may be classified according to their probability of payment. This information may be displayed interactively in views developed on dashboards (aspect 4 of FIG. 4). Additionally, after verifying payment (or not) of these invoices, the system may be fed with this information, and thus the process described in FIG. 6 may be applied again, with the update of the predictive models and the segmentations being performed with the inclusion of new data.

Figure 7:
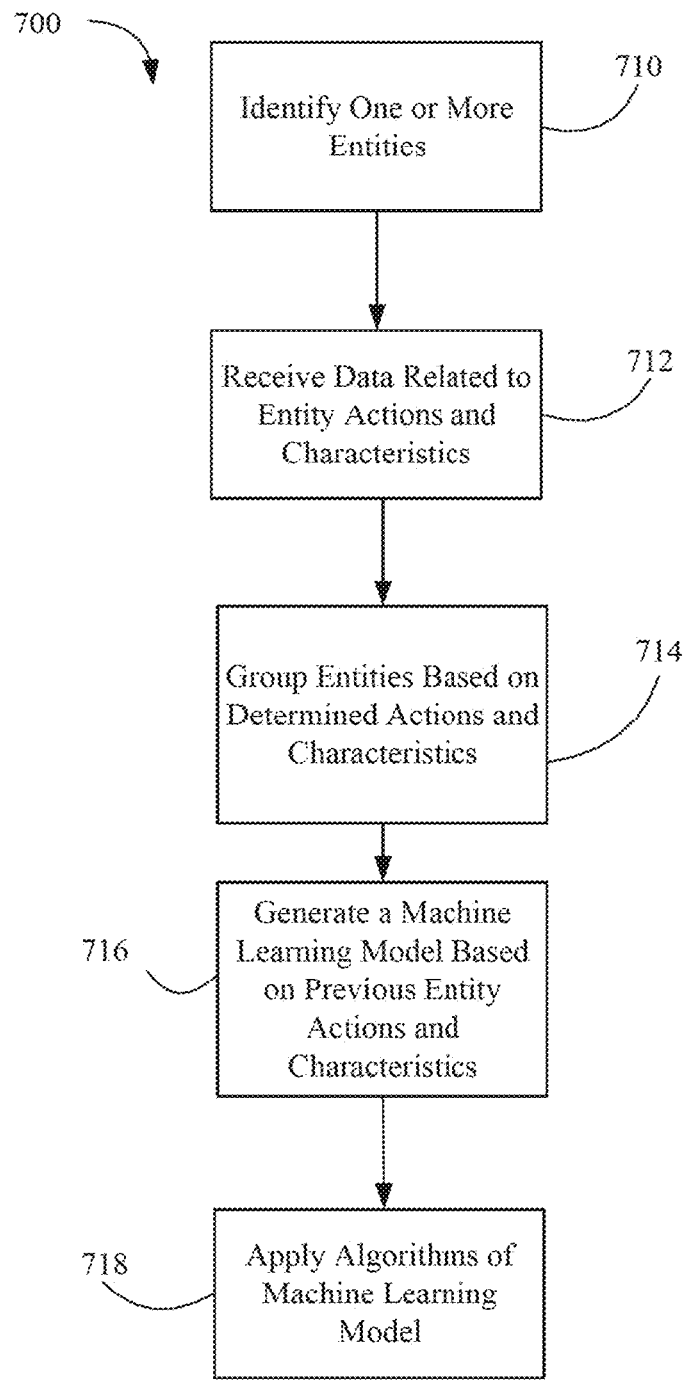
FIG. 7 illustrates a method of an artificial intelligence system according to an exemplary embodiment.

FIG. 7 illustrates an exemplary process 700 of a computing device at the intermediate level 120, such as an intermediate level server 122. In Block 710, an intermediate level server 122 may identify one or more customer entities. At Block 712, intermediate level server 122 may receive and determine actions, behaviors, and characteristics of the entities with respect to payment of accounts receivable. At Block 714, intermediate level server 122 may group the entities based on a determined action, characteristic and/or behavior. The intermediate level server 122 may further use and/or generate a predictive model (e.g., machine learning model) related to the actions, characteristics and/or behavior of the entities (Block 716), and apply algorithms of the predictive model to predict probability of payment or non-payment on the accounts receivable or future behavior of the entities with respect to the payment or non-payment of the same (Block 718).

Figure 8:
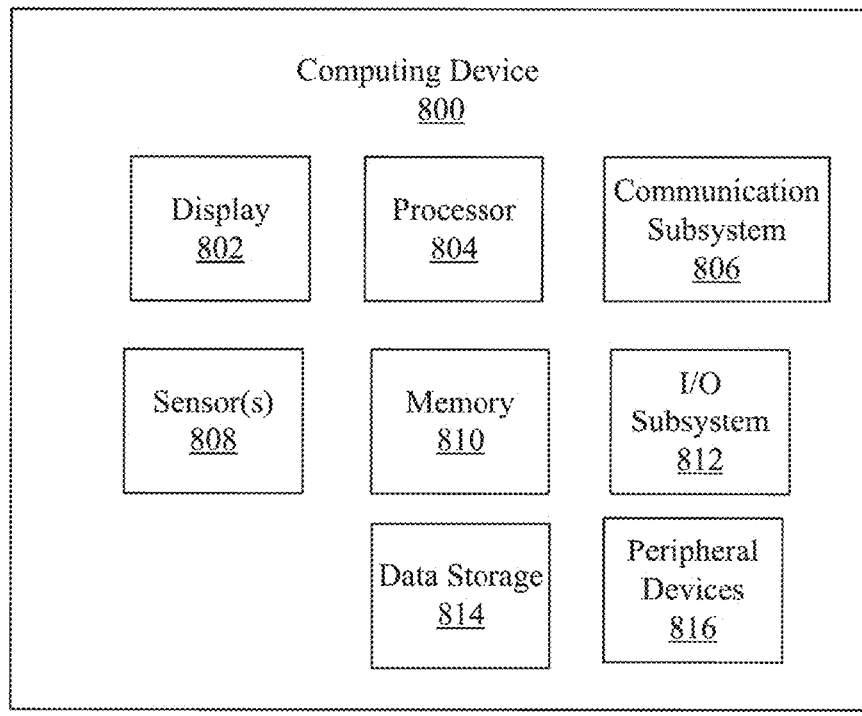
FIG. 8 illustrates a computing device for performing a method of an artificial intelligence system according to an exemplary embodiment.

Referring now to FIG. 8, an exemplary computing device 800 (e.g., an intermediate level server 122) for performing the method 700 of FIG. 7 is shown. The computing device 800 may include a processor 804, a memory 810, a data storage 814, a communication subsystem 806 (e.g., transmitter, receiver, transceiver, etc.), and an I/O subsystem 812. Additionally, in some embodiments, one or more of the illustrative components may be incorporated in, or otherwise form a portion of, another component. For example, the memory 810, or portions thereof, may be incorporated in the processor 804 in some embodiments. The computing device 800 may be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device.

The processor 804 may be embodied as any type of processor capable of performing the functions described herein. For example, the processor 804 may be embodied as a single or multi-core processor(s), digital signal processor, microcontroller, or other processor or processing/controlling circuit.

The memory 810 may be embodied as any type of volatile or non-volatile memory or data storage capable of performing the functions described herein. In operation, the memory 810 may store various data and software used during operation of the computing device 800 such as operating systems, applications, programs, libraries, and drivers. The memory 810 is communicatively coupled to the processor 804 via the I/O subsystem 812, which may be embodied as circuitry and/or components to facilitate input/output operations with the processor 804 the memory 810, and other components of the computing device 800.

The data storage device 814 may be embodied as any type of device or devices configured for short-term or long-term storage of data such as, for example, memory devices and circuits, memory cards, hard disk drives, solid-state drives, non-volatile flash memory, or other data storage devices. With respect to generating and applying a predictive model (e.g., machine learning model), the data storage device 328 may store the above-discussed data that is used to generate the predictive model. Alternatively, such data may be stored remotely.

The computing device 800 may also include a communications subsystem 806, which may be embodied as any communication circuit, device, or collection thereof, capable of enabling communications between the computing device 800 and other remote devices over a computer network (not shown). The communications subsystem 806 may be configured to use any one or more communication technology (e.g., wired or wireless communications) and associated protocols (e.g., Ethernet, Bluetooth®, Wi-Fi®, WiMAX, LTE, etc.) to affect such communication.

As shown, the computing device 800 may further include one or more peripheral devices 816. The peripheral devices 816 may include any number of additional input/output devices, interface devices, and/or other peripheral devices. For example, in some embodiments, the peripheral devices 816 may include a display, touch screen, graphics circuitry, keyboard, mouse, speaker system, microphone, network interface, and/or other input/output devices, interface devices, and/or peripheral devices. The computing device 800 may also perform one or more of the functions described in detail above and/or may store any of the databases referred to below.

Figure 9:

FIGS. 9-27 illustrate GUIs (e.g., views or dashboards) according to exemplary embodiments. FIG. 9 illustrates a GUI by which an analyst at an intermediate level 120 or service provider level 130 may see its customer's (e.g., clients) accounts receivable. In FIG. 9, aging accounts receivable of selected customers may be viewed. Selecting any customer may present the same customer-specific view. Thus, each analyst may work with focus and direction according to the financial status of the portfolios the analyst is monitoring.

Figure 10:
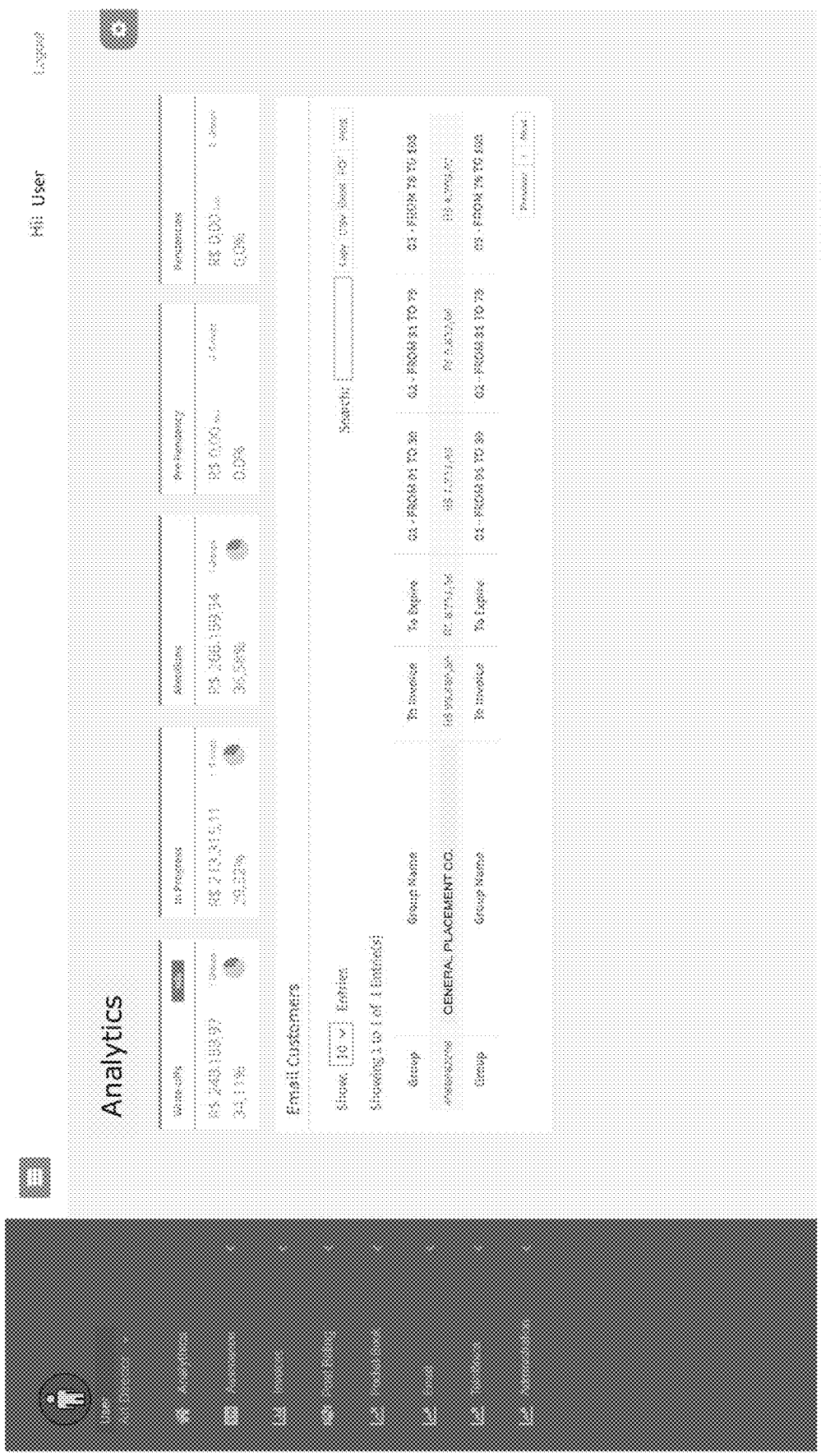
Figure 11:
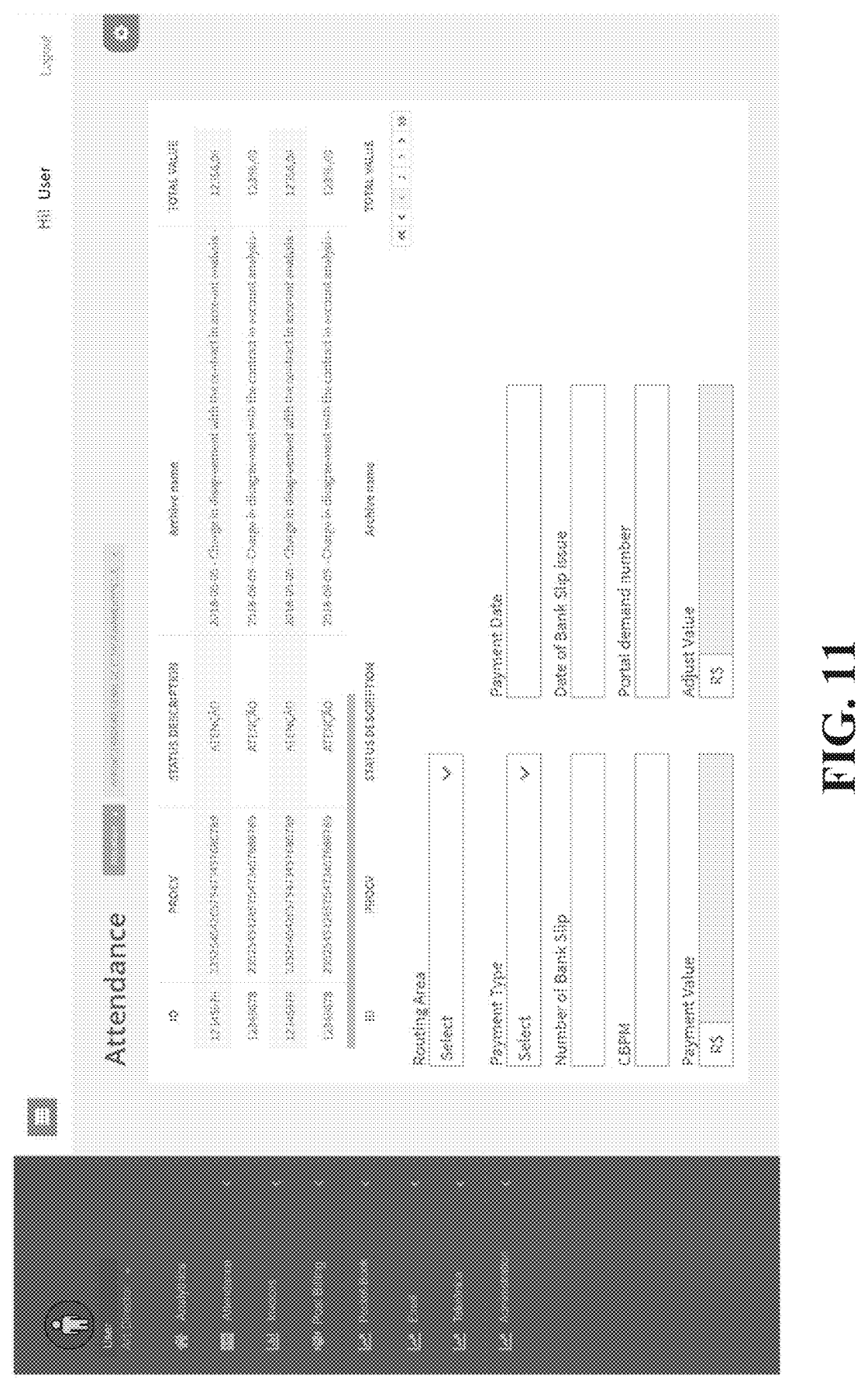

FIG. 10 illustrates an interface via which an analyst may communicate with, for example, a client regarding a specific status of an invoice. Such functionality is available at the intermediate level 120 or the service provider level 130. FIG. 11 illustrates a GUI screen where an intermediate level analyst or service provider level analyst may select a specific client or group of clients for the purpose of discussing an invoice according to an exemplary embodiment.

Figure 12:
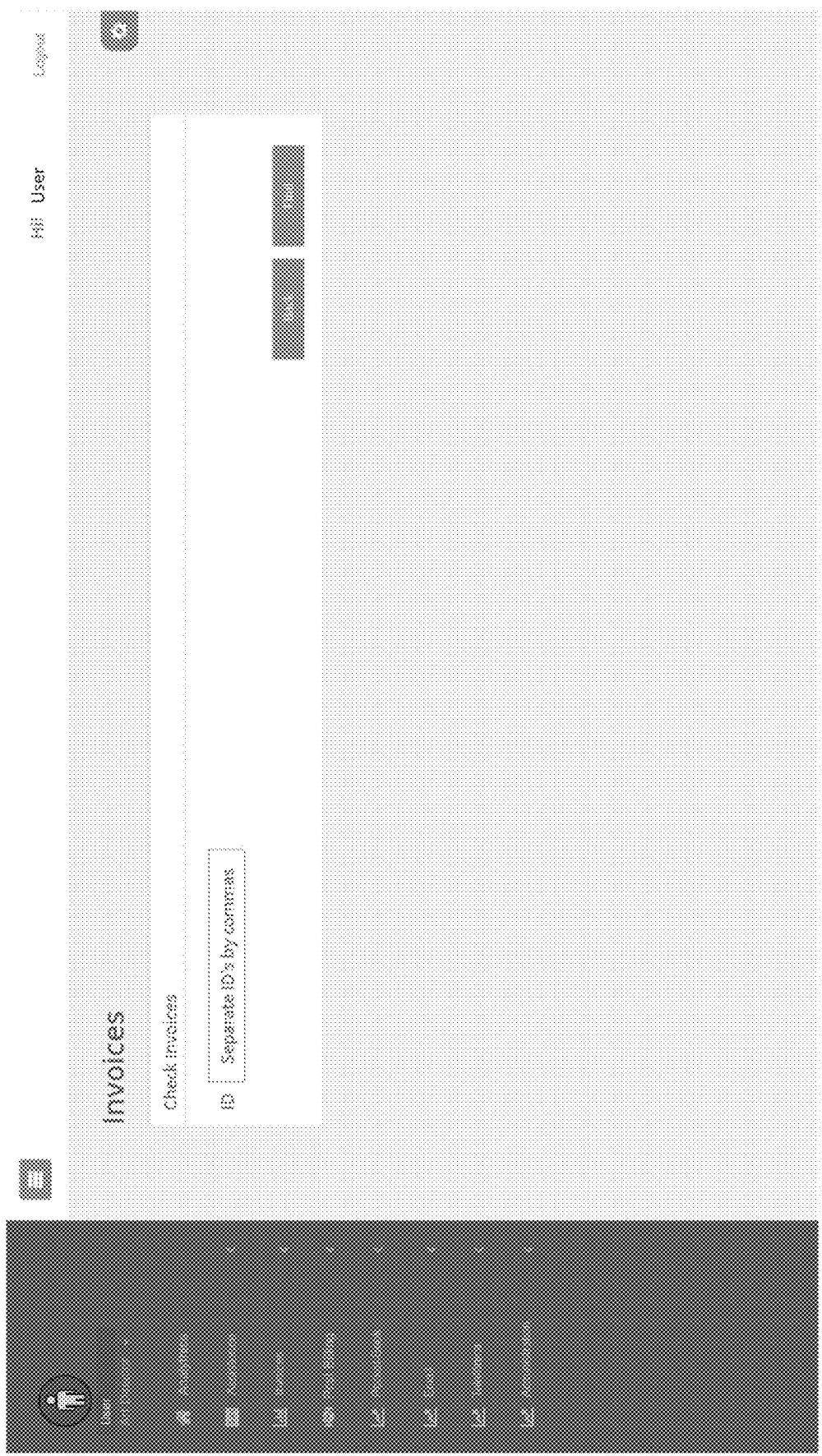

FIG. 12 illustrates a GUI view that may be accessed at an intermediate level 120 or service provider level 130. The view of FIG. 12 may allow analysts to search for and visually identify accounts that are in critical need of attention. Color coding may be applied to views to easily identify accounts needing immediate attention.

Figure 13:
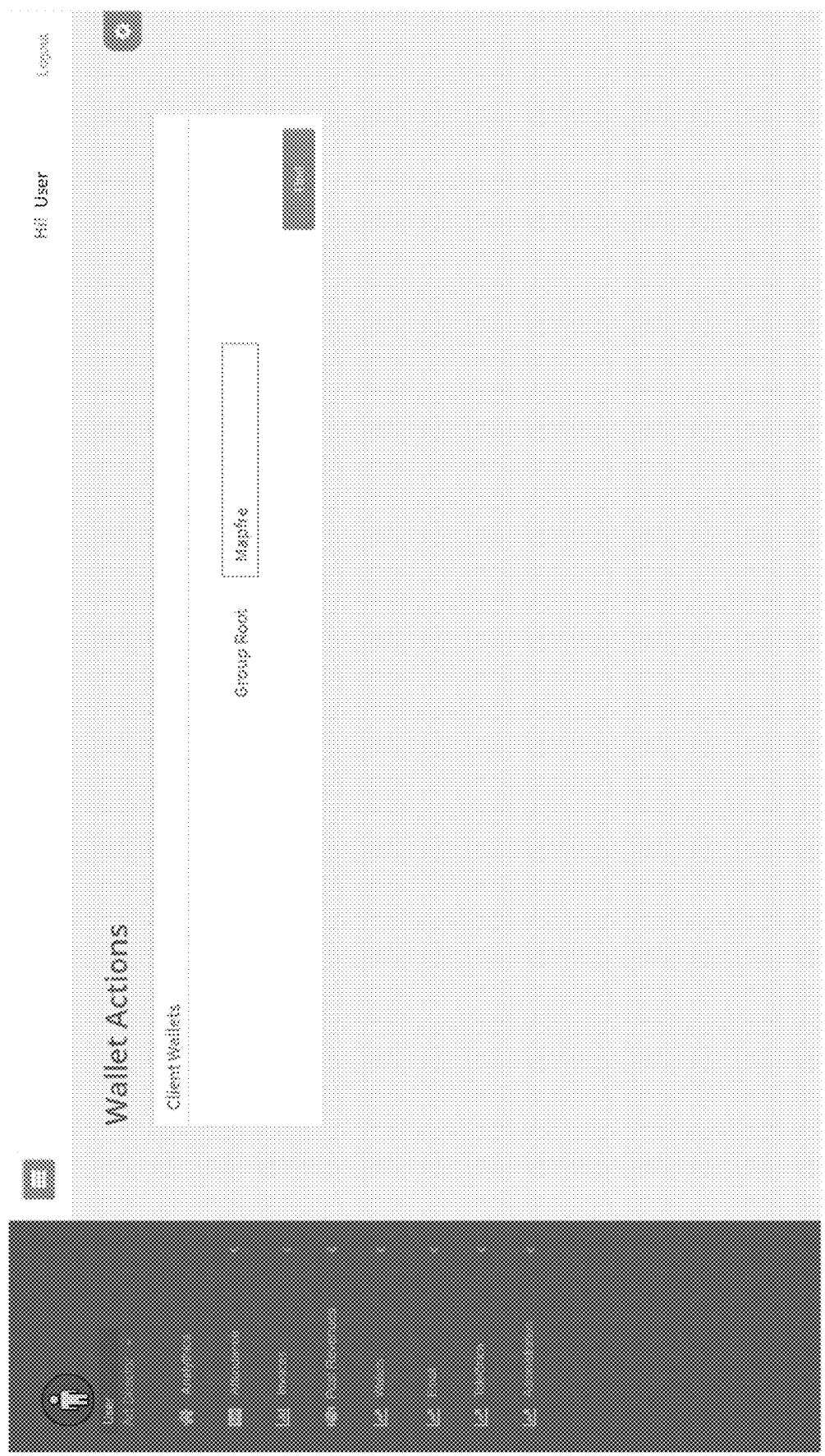

FIG. 13 illustrates an interface by which an analyst may search for and select a client wallet. A client's wallet may indicate how much of a financial interest or other vested interest the client has in a particular company or product. The interface of FIG. 13 may be available to an analyst at an intermediate level 120.

Figure 14:
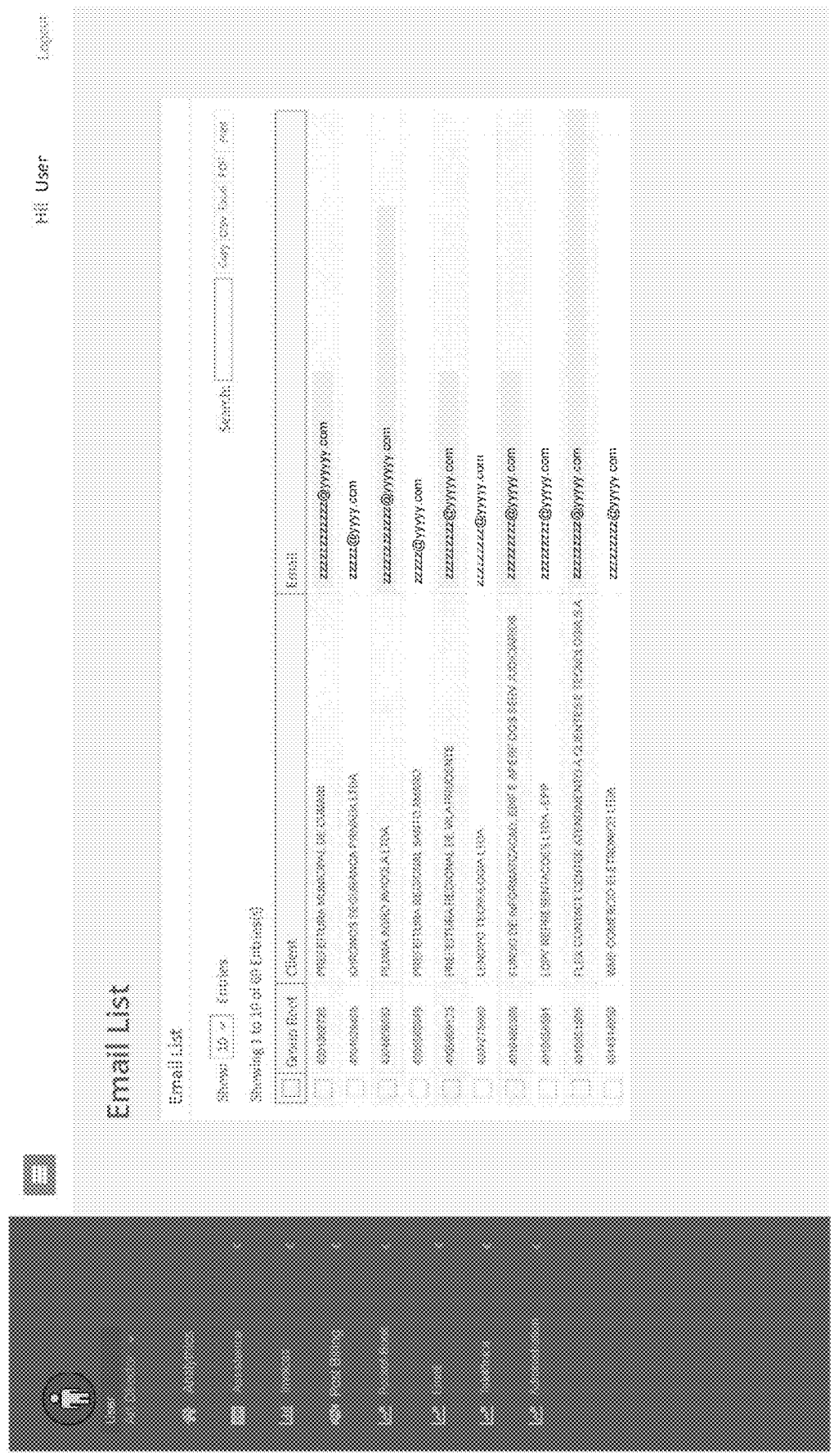
Figure 15:
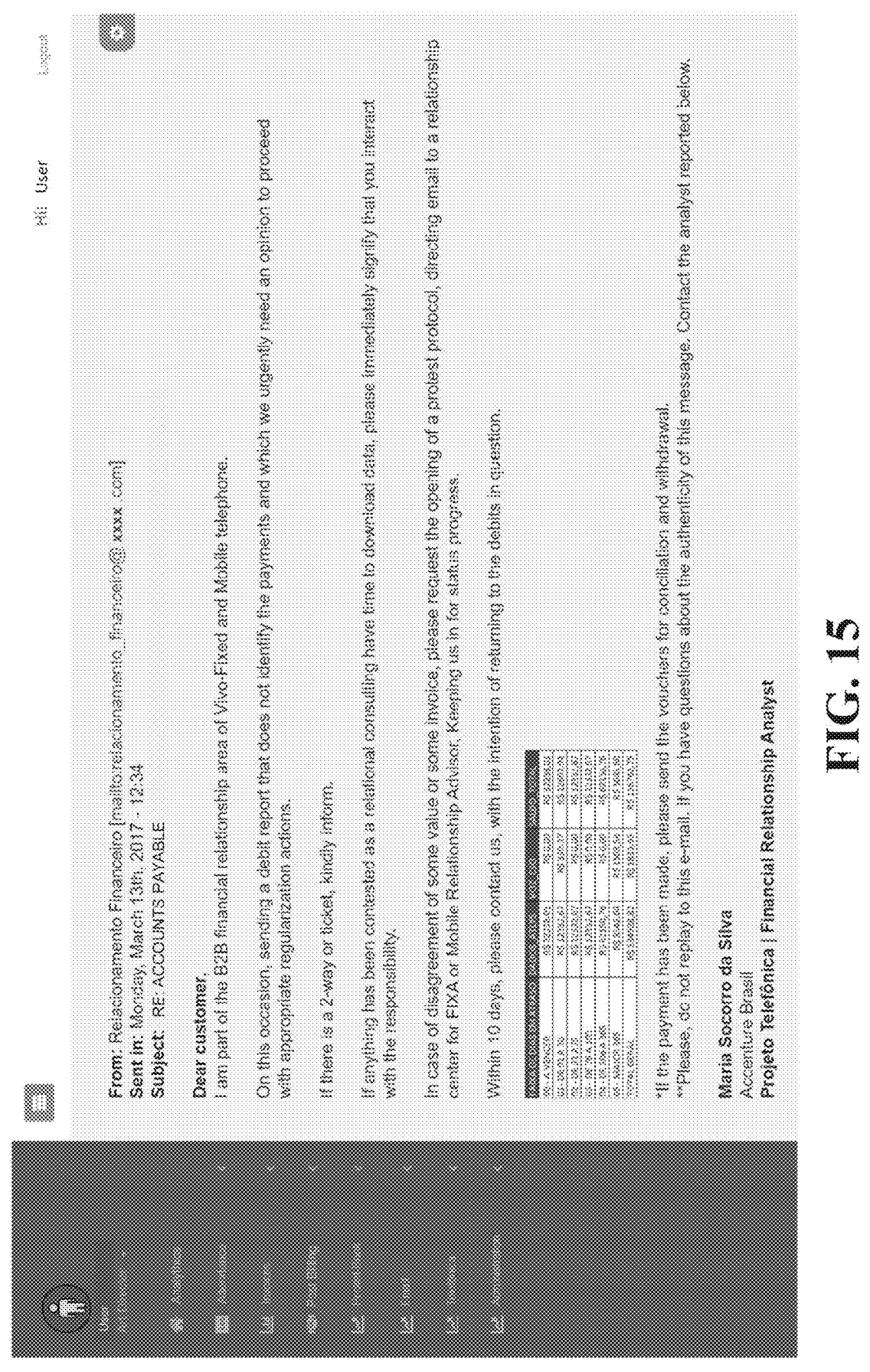

FIG. 14 shows an interface and functionality according to an exemplary embodiment, where an analyst may register the email of a client and schedule automatic transmission of emails directly to the client without any manual manipulation. A collection scorecard algorithm assigned to a client may determine a standard mail script to be used and sent automatically. FIG. 15 illustrates an exemplary mail template by which a client receives a standard, automatic e-mail script. The mail template may include a layout of the accounts and attached spreadsheets detailing all open invoices, separated by billing system and age of the accounts receivable.

Figure 16:
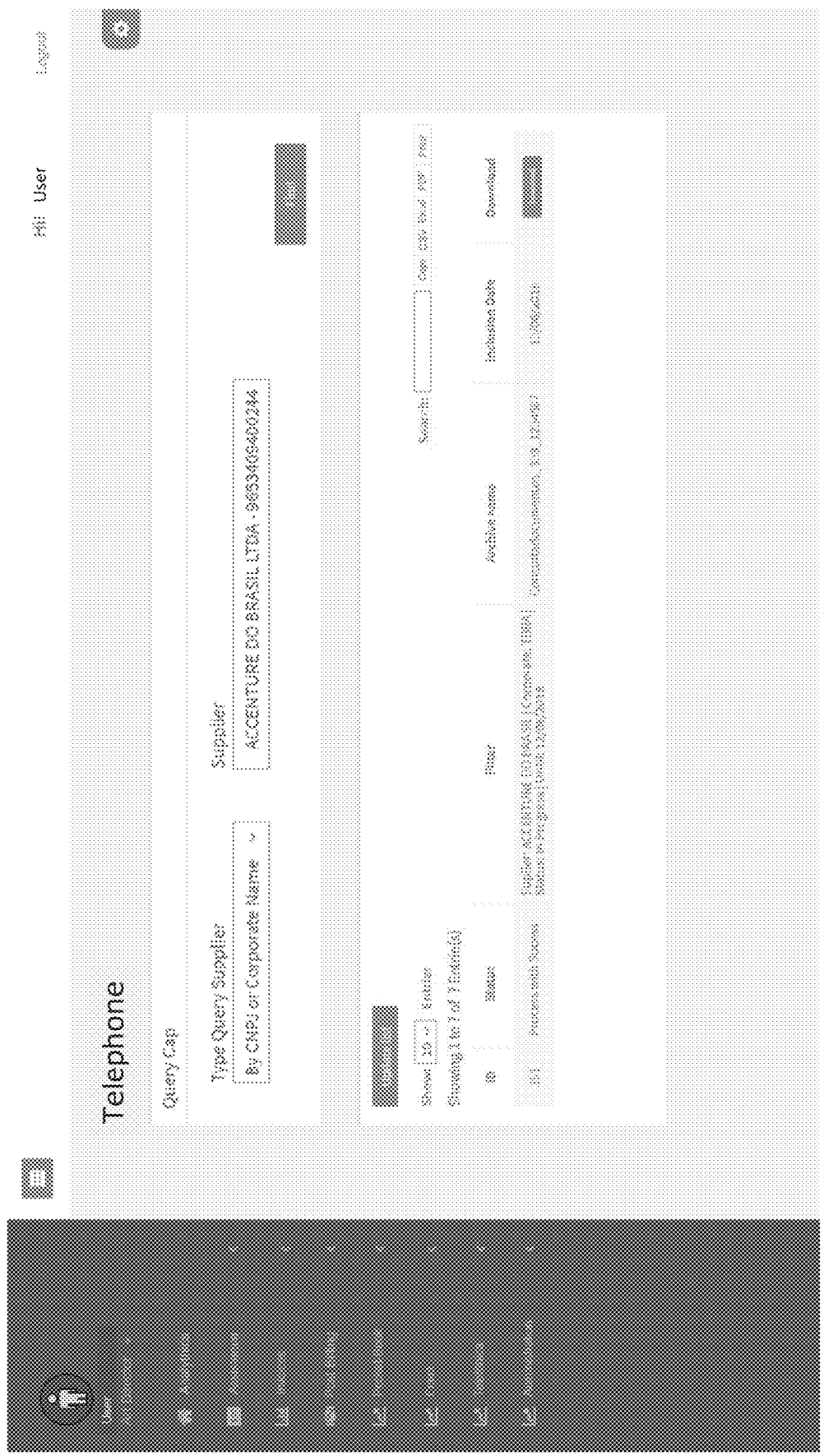

FIG. 16 illustrates a GUI view that may be provided at an intermediate level 120 or at a service provider level 130, where the financial analyst at each level may consult the accounts payable from suppliers. Through robotics product automation (RPA), an analyst at intermediate level 120 may search for the most recent accounts payable directly from a system application product (SAP), so the financial analyst may have greater visibility of the client from a macro-perspective and may be able to suggest a credit opinion with more foundation as well as better debit negotiation through account conciliation.

Figure 17:
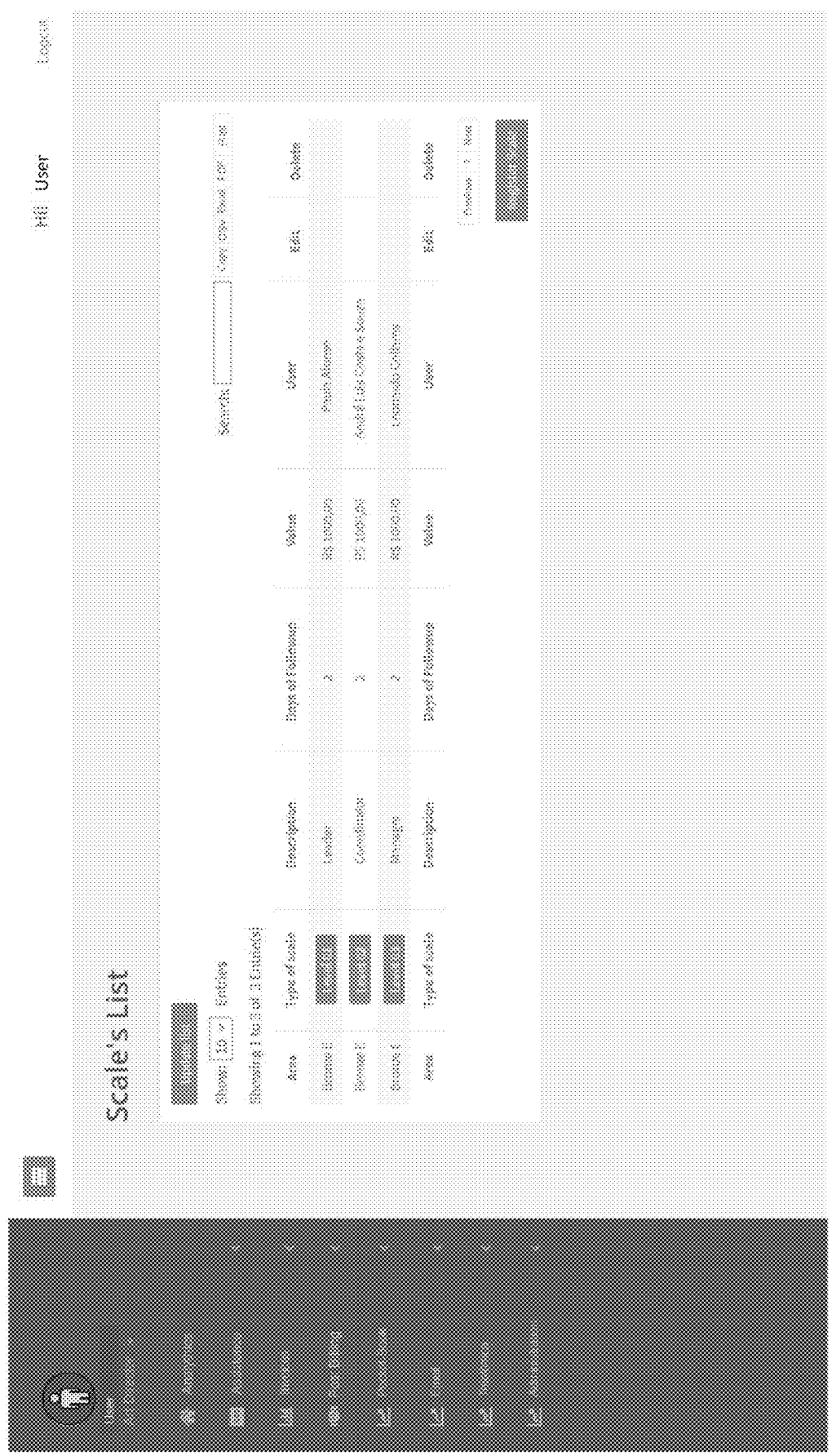

Turning now to FIG. 17, illustrated is a GUI interface implemented at least at the intermediate level 120, based on policies defined at a service provider level 130. This interface shows the follow-up status of scenarios/processes that derive from the escalation of a matter. Such situations that may require an escalation include, for example: promises to pay balances, pending account adjustments, commercial discounts, etc.

Figure 18:
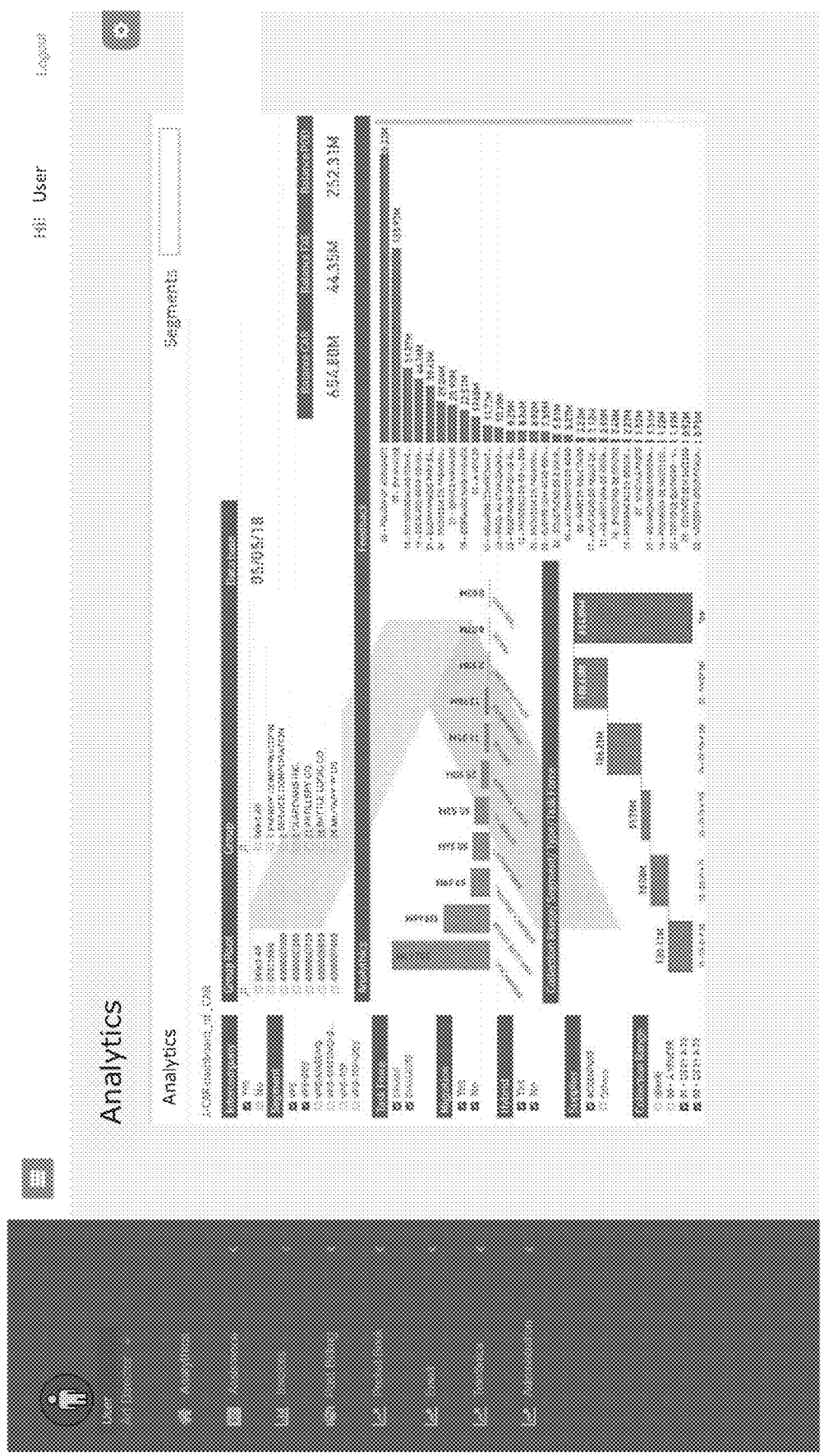
Figure 19:
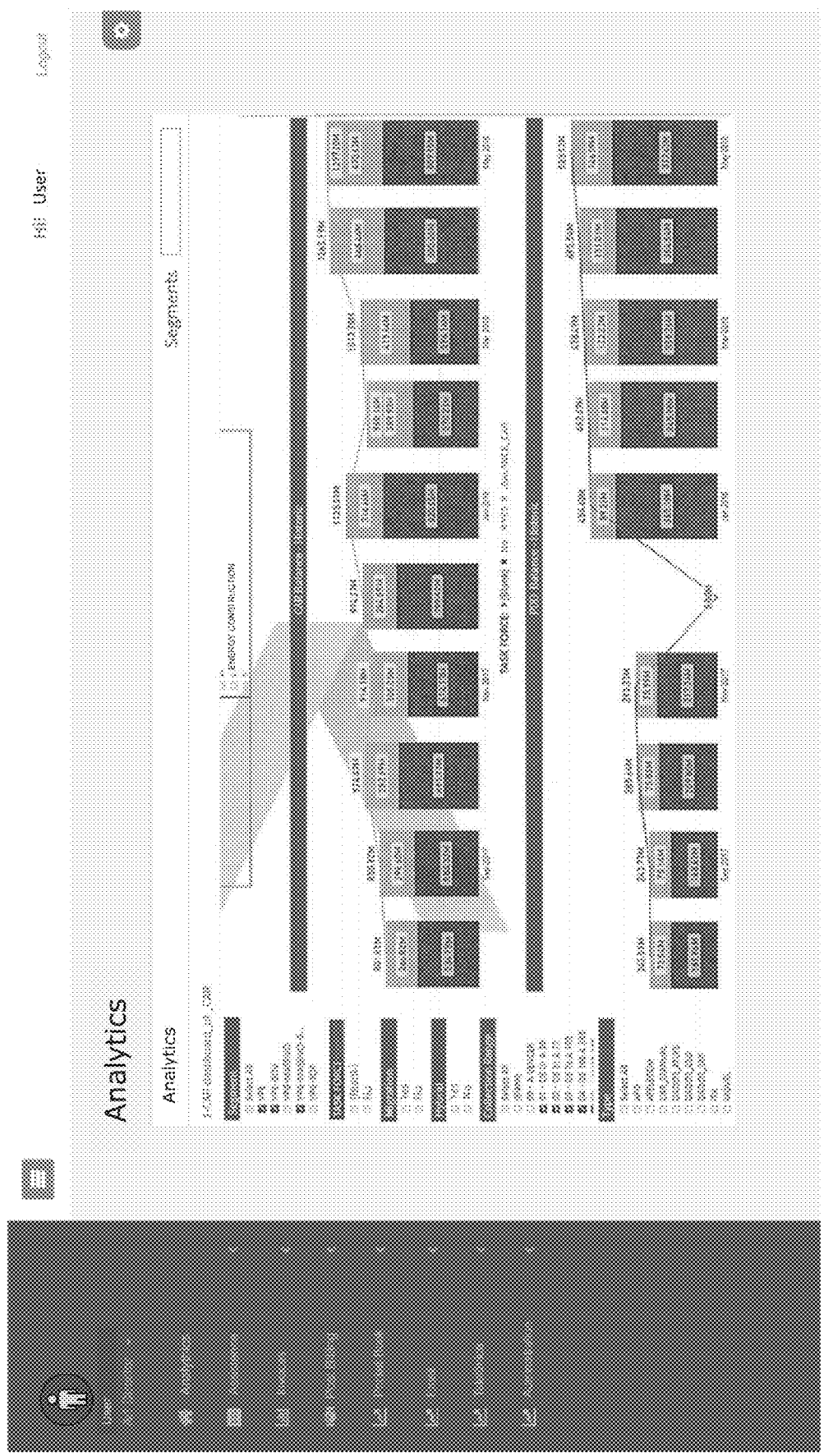
Figure 20:
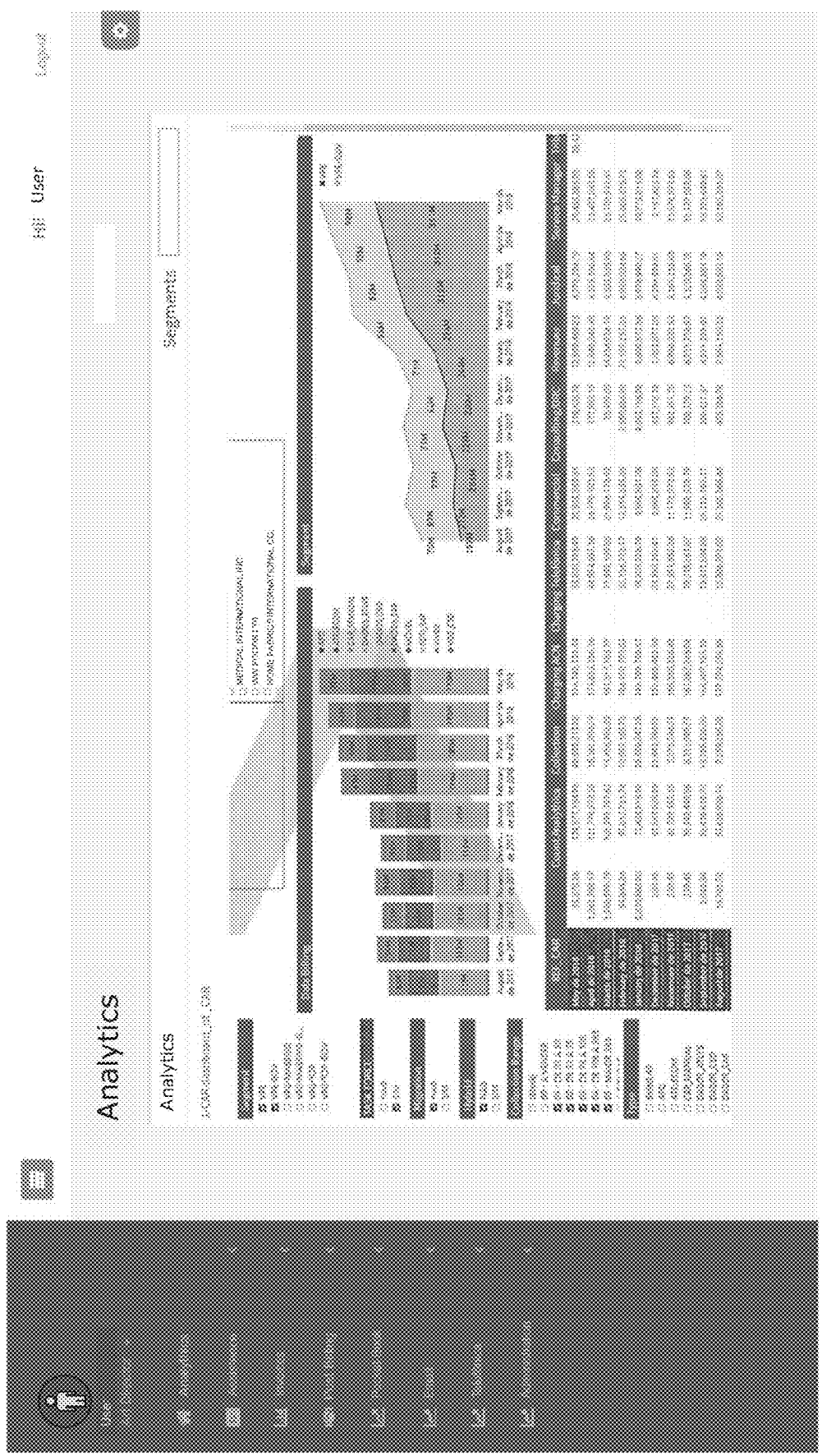

FIG. 18 illustrates a GUI dashboard that may be implemented at an intermediate level 120 or a service provider level 130. Via this dashboard, a financial analyst may select a specific segment or customer view on the status of an accounts receivable. The selected segment or customer view may provide details about, for example, a particular Service Manager, Fraud, Disputes, etc., and feedback that has been provided regarding the accounts receivable. Such may be performed with respect to aged accounts receivables. A GUI dashboard may be opened by a business segment, billing product and vendor, i.e., regardless of whether the account is managed by a business process outsourcing (BPO) or another company. FIG. 19 illustrates an interface via which analyst teams may have a view of the evolution of accounts receivables that can be opened-up to the client level, that are separated by total payments and that only reflect bad debt. FIG. 20 is an interface which shows the evolution of billing by the month, as well as an opening by an offending area (i.e., various departments involved in the billing and payment processing of a customer).

Figure 21:
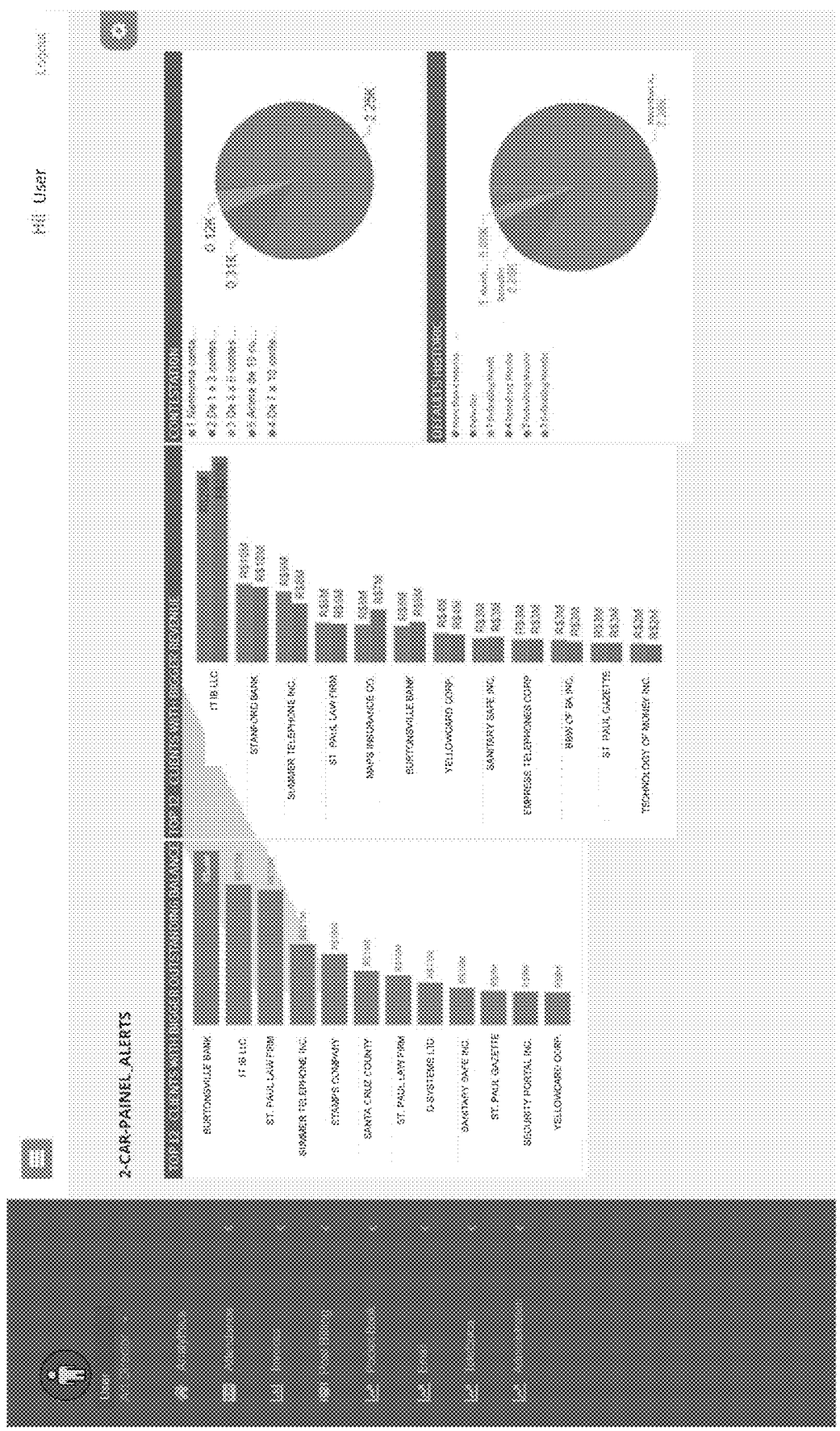
Figure 22:
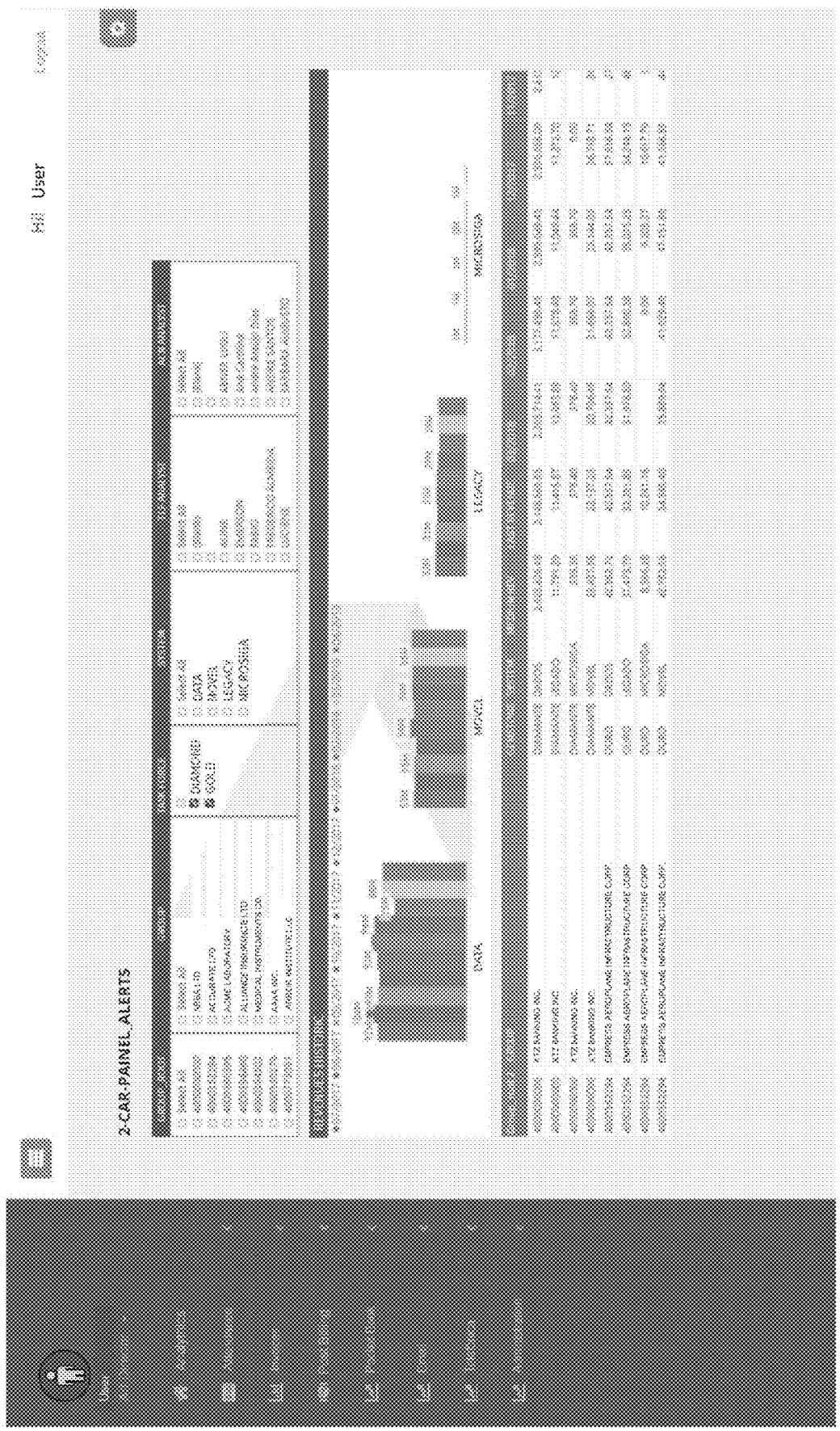

FIG. 21 depicts a GUI view that shows the largest customers, based on debit balance and billing, as well as a history of times that there is a dispute with a customer and a history of customer default. This view may be implemented at the intermediate level 120 or the service provider level 130. FIG. 22 illustrates a view of a commercial classification of all clients and their billing systems, which may help and support a credit analysis. This view also shows the average monthly billing versus the last billing, and with this view deviations may be identified as repressed billing for a proactive negotiation.

Figure 23:
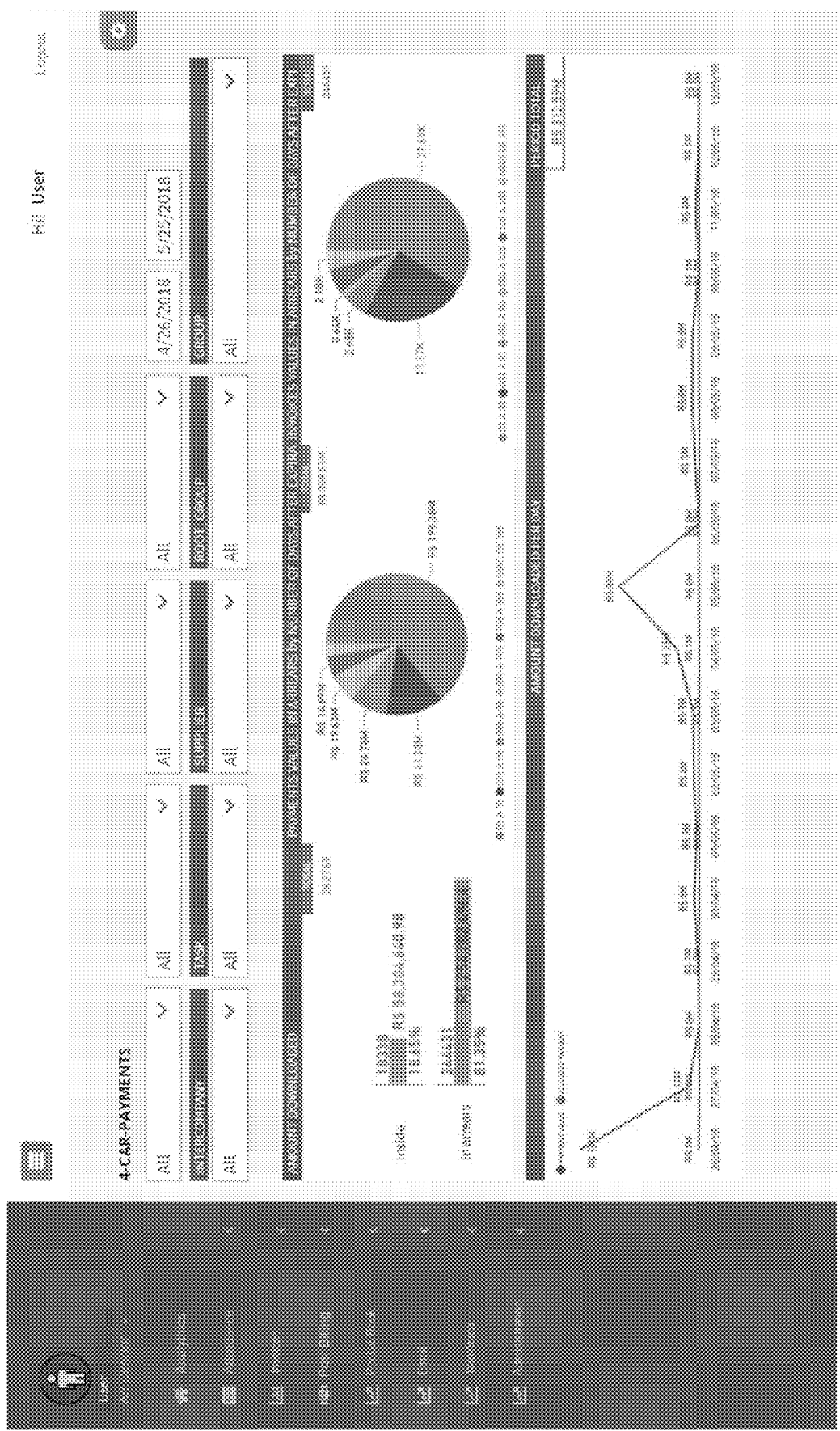
Figure 24:

FIG. 23 is a GUI view that may be used at an intermediate level 120 and a service provider level 130 to monitor daily the performance of recovery, separated by aging of delay and total number of invoices, as well as a separation between total receivables and bad debt. FIG. 24 is a GUI view that may be implemented at an intermediate level 120 or a service provider level 130 to monitor the performance of an operation. Key performance indicators (KPIs) may be the basis for scores that are assigned to a particular analyst. An advantage of such operational control may be that an analyst can access his/her KPIs and is able to follow his/her performance—the analyst knows exactly what changes to make to improve results.

Figure 25:
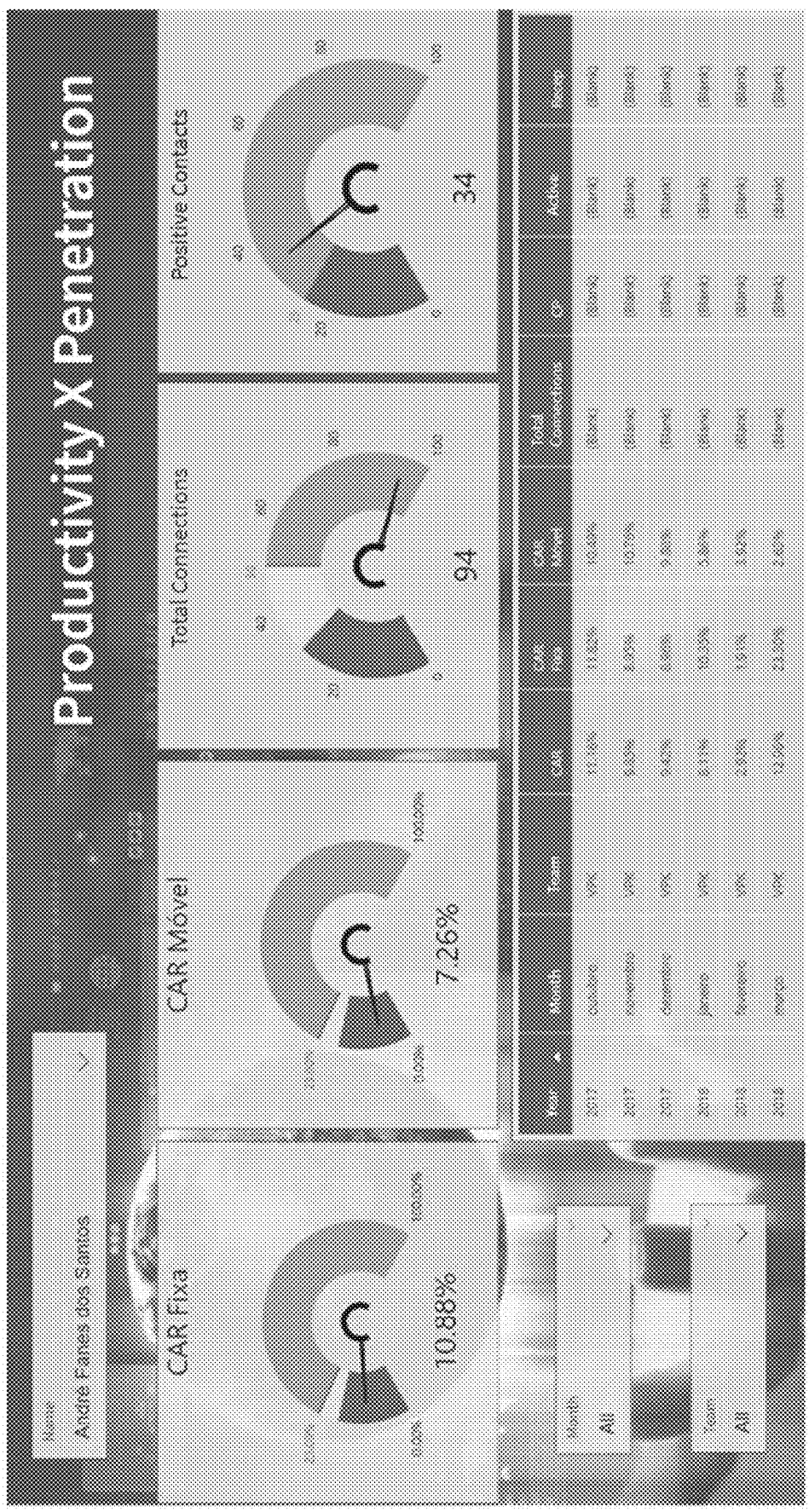
Figure 26:

FIG. 25 illustrates a GUI view that may be implemented at an intermediate level 120 or a service provider level 130, where the GUI view illustrates a financial recovery (e.g., collection recovery) between fixed and mobile products, and in addition illustrates an important indicator for a service provider customer, such as the penetration of a customer (e.g., the quality of the contact). FIG. 26 is a view that may be accessed at an intermediate level 120. This view may allow an analyst to follow, in real time, the results related to feedback with respect to a qualitative audit. In FIG. 26, the attained score is 94.51% against a goal of 90%, which indicates an acceptable score (e.g., shows quality audits performed by an audit team).

Figure 27:
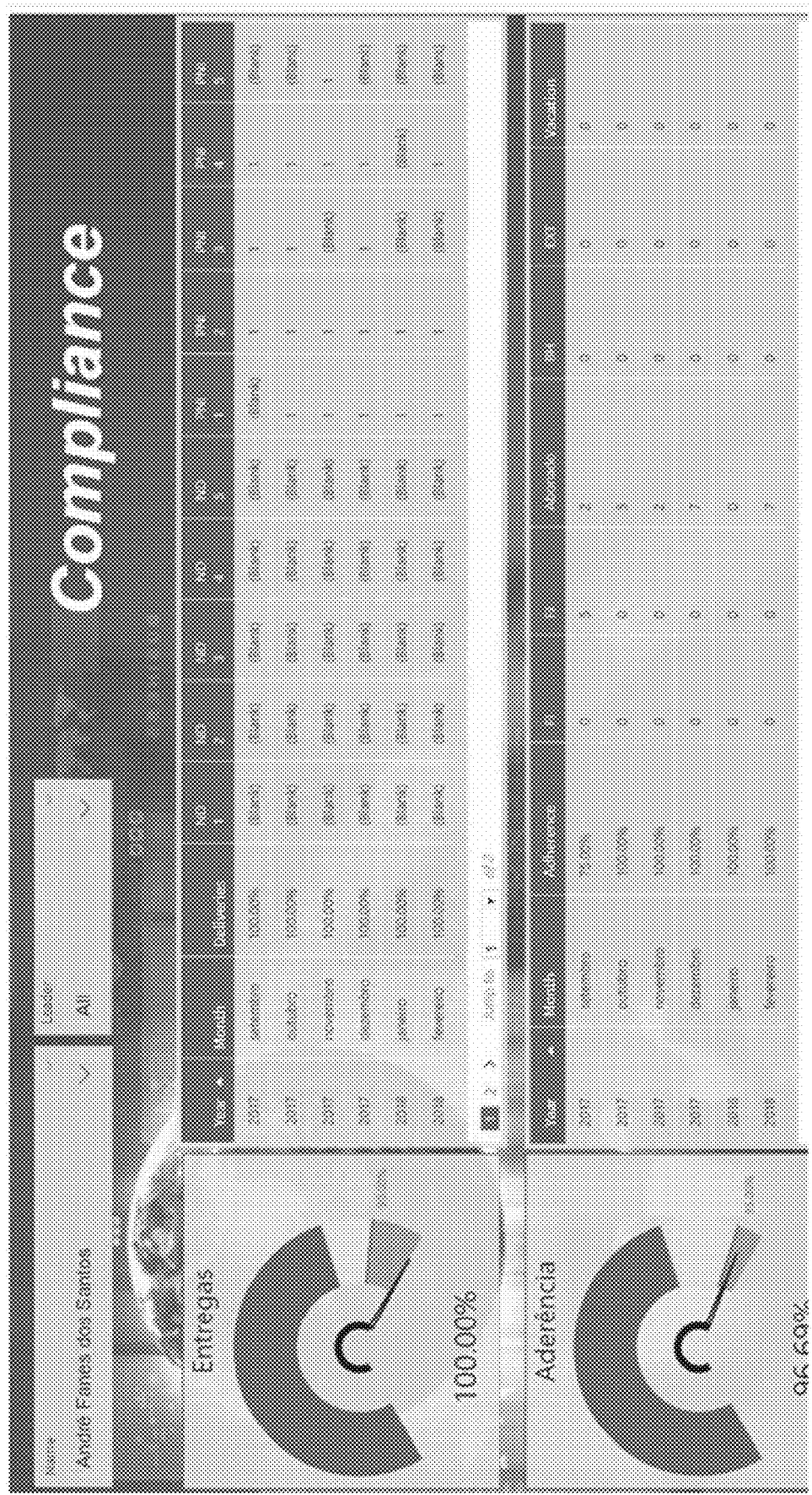

FIG. 27 illustrates a view that may be implemented at an intermediate level 120, where an analyst may track the performance of a customer with respect to compliance in a system registry of all documentation related to the process being performed. In FIG. 27, the goal is 90% however 100% is achieved. FIG. 27 may further illustrate another type of analytics. For example, it may show numbers indicating whether an analyst is complying with the norms and policies of a client and also may indicate the frequency of the analyst in the office and visits to clients.

Figure 28:
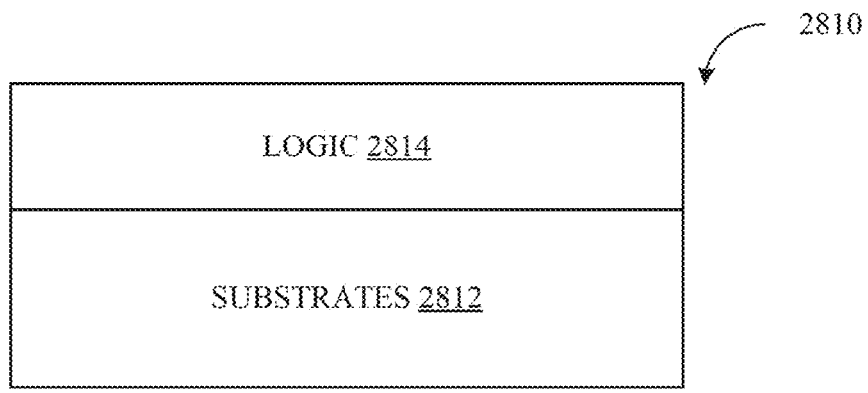
FIG. 28 is a block diagram of an example of a semiconductor package apparatus according to an embodiment.

Turning now to FIG. 28, an embodiment of a semiconductor package apparatus 2810 includes one or more substrates 2812 (e.g., silicon, sapphire, gallium arsenide, etc.) and machine learning logic 2814 (e.g., transistor array and other integrated circuit/IC components, etc.) coupled to the substrates 2812. The apparatus 2810 may be implemented in one or more components of the intermediate level 120 (FIG. 1), already discussed. Moreover, the apparatus 2810 may implement one or more of the aspects of the method 700 (FIG. 7), already discussed.

Embodiments of the machine learning logic 2814, and other components of the apparatus 2810, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof.

Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Figure 29:
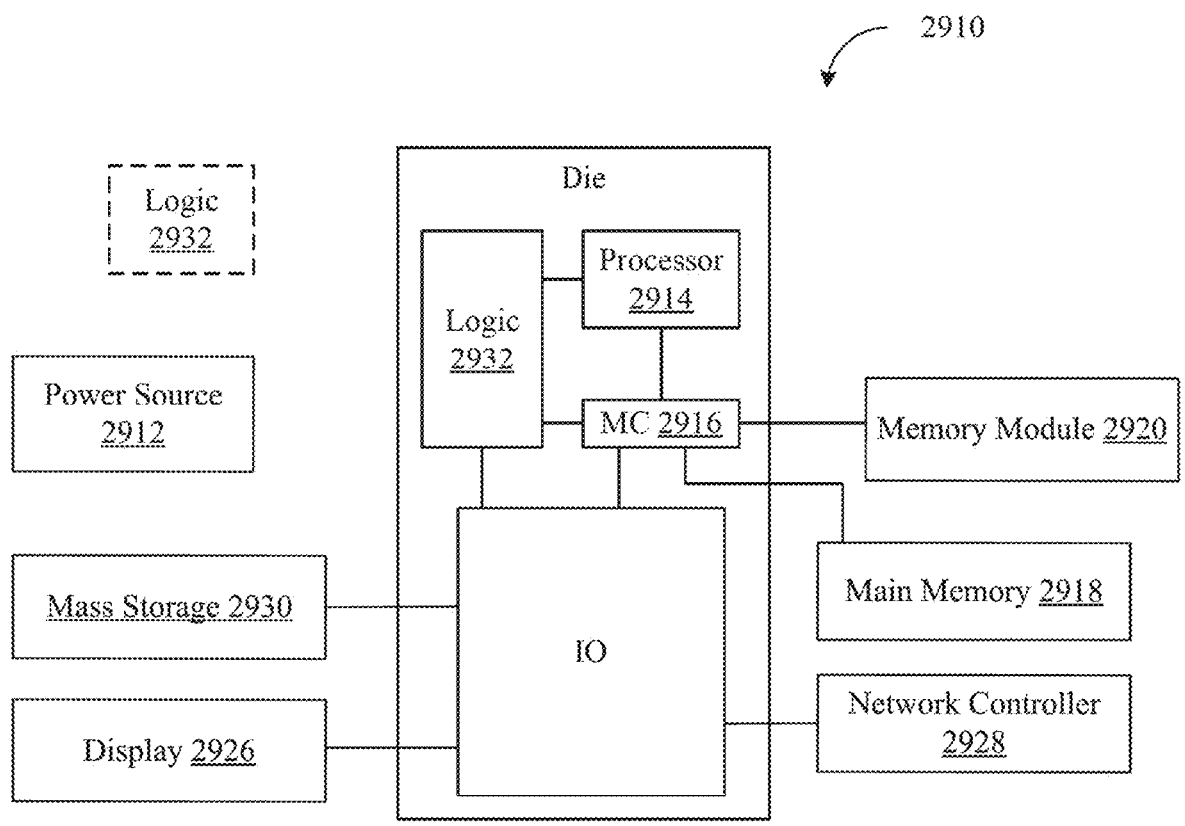
FIG. 29 is a block diagram of an example of another computing system according to an embodiment.

Turning now to FIG. 29, an example of an electronic processing system 2910 is shown to provide the application and/or implementation of machine learning to data related to actions, behavior and characteristics of entities according to an embodiment. The system 2910 may generally be part of an electronic device/platform having computing functionality (e.g., datacenter, cloud server, personal digital assistant/PDA, notebook computer, tablet computer, laptop, and so on.

The system 2910 includes a power source 2912. The system 2910 also includes a processor 2914, such as a micro-processor, an embedded processor, a digital signal processor (DSP), a central processing unit (CPU), a graphical processing unit (GPU), a visual processing unit (VPU), a network processor, hardware that executes code to implement one or more aspects of the technology described herein, etc. For example, the processor 2914 may include one or more cores to execute operations (e.g., a single-threaded core, a multithreaded core including more than one hardware thread context (or "logical processor") per core, etc.). The processor 2914 may also be coupled to internal storage such as a cache (e.g., instruction cache, data cache, single level cache, multilevel cache, shared cache, strictly inclusive cache, exclusive cache, etc.), etc.

In the illustrated example, the processor 2914 is communicatively coupled to a memory controller 2916 that controls access to a memory device. The illustrated memory controller 2916 is communicatively coupled to main memory 2918. The main memory 2918 may include, for example, RAM, ROM, PROM, EPROM, EEPROM, etc., PCM, 3D memory, etc. The memory controller 2916 is also communicatively coupled to memory module 2920. The memory module 2920 may include, for example, DRAM configured as one or more memory modules such as dual inline memory modules (DIMMs), small outline DIMMs (SODIMMs), etc. Thus, the memory controller 2916 may control direct memory access (DMA), remote DMA (RDMA), and so on.

The system 2910 also includes an input output (IO) module 2922 implemented together with the processor 2914 and the memory controller 2916 on a semiconductor die 2924 as an SoC, wherein the IO module 2922 functions as a host device and may communicate with, for example, a display 2926 (e.g., touch screen, liquid crystal display/LCD, light emitting diode/LED display), a network controller 2928 (e.g., Ethernet controller, etc.), and mass storage 2930 (e.g., hard disk drive/HDD, optical disk, flash memory, etc.). The system 2910 further includes logic 2932 communicatively coupled to the processor 2914, the memory controller 2916, and the IO module 2922 on the semiconductor die 2924. The logic 2932 may also be implemented elsewhere in the system 2910 and/or outside of the system 2910. The logic 2932 may be the same as one or more the machine learning logic 2814 (FIG. 28), already discussed. Moreover, the logic 2932 may implement one or more of the aspects of the method 700 (FIG. 7), discussed above. Thus, the logic 2932 applies machine learning to various input data.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like.

Those skilled in the art will appreciate from the foregoing description that the broad techniques of the one or more embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An artificial intelligence system, comprising:
   one or more client entities;
   a storage device configured to store data related to actions and characteristics of said one or more client entities, the actions and characteristics relating to payment of accounts receivable;
   a first server level including at least two SQL servers, the at least two SQL servers transmitting files amongst each other via a file transfer protocol and processing first data; and
   a second server level including at least one server, the at least one server, implemented at least partly in one or more of configurable logic or fixed-functionality logic hardware, configured to:
   receive the first data;
   automatically generate and update a machine learning model based on the actions and characteristics of said one or more client entities;
   predict future actions of said one or more client entities with respect to the payment of accounts receivable, based on results of the machine learning model;
   automatically cluster a subset of said one or more entities based on characteristics common to each of said one or more entities in the subset, the characteristics being based on the machine learning model; and
   automatically generate an interactive graphic user interface related to the subset, the interactive graphic user interface including a selectable view of data of each of said one or more entities in the subset.

2. The artificial intelligence system of claim 1, wherein an updated machine learning model replaces a previous machine learning model.

3. The artificial intelligence system of claim 1, wherein predictive modeling using segmentation is applied to cluster the subset of said one or more entities.

4. The artificial intelligence system of claim 1, wherein the machine learning model uses predictive modeling techniques to calculate a probability of an occurrence of a business-related event.

5. The artificial intelligence system of claim 1, wherein the machine learning model uses neural networks to calculate a probability of non-payment of invoices.

6. An apparatus comprising:
   a first interface configured to receive input on identities of one or more entities;
   a second interface configured to receive data related to actions and characteristics of said one or more entities, the actions and characteristics being related to payment of accounts receivables; and
   a first server level and a second server level, each communicatively coupled to a storage device, the first interface and the second interface, wherein the storage device is configured to store the data related to actions and characteristics of said one or more entities,
   wherein the first server level includes at least two SQL servers, the at least two SQL servers transmitting files amongst each other via a file transfer protocol and processing first data,
   wherein the second server level includes at least one server, the at least one server, implemented at least partly in one or more of configurable logic or fixed-functionality logic hardware,
   wherein the at least one server is configured to:
   receive the first data;
   group said one or more entities based on the actions and characteristics of said one or more entities;
   automatically generate a machine learning model based on the data related to previous actions and characteristics of said one or more entities;
   apply one or more algorithms of the machine learning model to predict probability of payment or non-payment on the accounts receivable;
   automatically cluster a subset of said one or more entities based on characteristics common to each of the said one or more entities in the subset, the characteristics being based on the machine learning model; and
   automatically instruct the second interface to generate an interactive graphic user interface related to the subset, the interactive graphic user interface including a selectable view of data of each of said one or more entities in the subset.

7. The apparatus of claim 6, wherein the at least one server is configured to replace the machine learning model with an updated machine learning model.

8. The apparatus of claim 6, wherein predictive modeling using segmentation is applied to cluster the subset of said one or more entities.

9. The apparatus of claim 6, wherein the machine learning model employs predictive modeling techniques to calculate a probability of an occurrence of a business-related event.

10. The apparatus of claim 6, wherein the machine learning model employs neural networks to calculate a probability of non-payment of invoices.

11. A method of an artificial intelligence system, the method comprising:
   identifying one or more entities;
   receiving first data related to actions and characteristics of said one or more entities, the actions and characteristics being related to payment of accounts receivable, the first data being received via at least one server of a second server level, the at least one server being implemented at least partly in one or more of configurable logic or fixed-functionality logic hardware, and the first data being received from a first server level including at least two SQL servers, the at least two SQL servers transmitting files amongst each other via a file transfer protocol and processing the first data;
   grouping, via the at least one server, said one or more entities based on the actions and characteristics of said one or more entities;

automatically generating, via the at least one server, a machine learning model based on the data related to previous actions and characteristics of said one or more entities;

applying one or more algorithms of the machine learning model to predict probability of a business-related event related to the accounts receivable; and automatically clustering, via the at least one server, a subset of said one or more entities based on characteristics common to each of the said one or more entities in the subset, the characteristics being based on the machine learning model; and automatically generating, via the at least one server, an interactive graphic user interface related to the subset, the interactive graphic user interface including a selectable view of each of data of said one or more entities in the subset.

12. The method of claim 11, further comprising updating the generated machine learning model with an updated machine learning model.

13. The method of claim 11, wherein the machine learning model employs predictive modeling techniques to calculate a probability of an occurrence of a business-related event.

14. The method of claim 11, further comprising applying predictive modeling using segmentation to cluster the subset of said one or more entities.

15. The method of claim 11, wherein the machine learning model employs neural networks to calculate a probability of non-payment of invoices.

16. A non-transitory computer readable medium comprising a set of instructions, which, when executed by at least one server of a second server level and implemented at least partly in one or more of configurable logic or fixed-functionality logic hardware, and when first data is received from a first server level including at least two SQL servers, the at least two SQL servers transmitting files amongst each other via a file transfer protocol and processing the first data, cause the at least one server to:

identify one or more entities;

receive the first data related to actions and characteristics of said one or more entities, the actions and characteristics being related to payment of accounts receivable;

group said one or more entities based on the actions and characteristics of said one or more entities;

automatically generate a machine learning model based on the data related to previous actions and characteristics of said one or more entities;

apply one or more algorithms of the machine learning model to predict probability of a business-related event related to the accounts receivable;

automatically cluster a subset of said one or more entities based on characteristics common to each of said one or more entities in the subset, the characteristics being based on the machine learning model; and automatically generate an interactive graphic user interface related to the subset, the interactive graphic user interface including a selectable view of each of data of said one or more entities in the subset.

17. The non-transitory computer readable medium of claim 16, wherein the set of instructions, when executed by the at least one server of the second server level, further cause the at least one server to update the generated machine learning model with an updated machine learning model.

18. The non-transitory computer readable medium of claim 16, wherein the machine learning model employs predictive modeling techniques to calculate a probability of an occurrence of a business-related event.

19. The non-transitory computer readable medium of claim 16, wherein predictive modeling using segmentation is applied to cluster the subset of said one or more entities.

20. The non-transitory computer readable medium of claim 16, wherein the machine learning model employs neural networks to calculate a probability of non-payment of invoices.

* * * * *

UNITED STATES PATENT AND TRADEMARK OFFICE
CERTIFICATE OF CORRECTION

| | | |
|---|---|---|
| PATENT NO. | : 11,227,269 B2 | Page 1 of 1 |
| APPLICATION NO. | : 16/181807 | |
| DATED | : November 6, 2018 | |
| INVENTOR(S) | : Leonardo Collares and Andre Souza | |

It is certified that error appears in the above-identified patent and that said Letters Patent is hereby corrected as shown below:

On the Title Page

At Line 1, Column 1, (72) Inventors, please delete "Tidade" and insert --Cidade-- therefor.

In the Specification

At Line 10, Column 12, Description of the Embodiments, please delete "C #" and insert --C#-- therefor.

In the Claims

At Line 29, Column 14, Claim 6, please delete "the said" and insert --said-- therefor.

At Line 7, Column 15, Claim 11, please after "receivable;", delete "and".

At Line 10, Column 15, Claim 11, please after "of", delete "the".

Signed and Sealed this
Twentieth Day of September, 2022

*Katherine Kelly Vidal*

Katherine Kelly Vidal
*Director of the United States Patent and Trademark Office*